(12) United States Patent
Olson et al.

(10) Patent No.: US 6,841,641 B2
(45) Date of Patent: Jan. 11, 2005

(54) COPOLYMERS COMPRISING LOW SURFACE TENSION (METH) ACRYLATES

(75) Inventors: Kurt G. Olson, Gibsonia, PA (US); Simion Coca, Pittsburgh, PA (US); James B. O'Dwyer, Valencia, PA (US); Joanne H. Smith, Allison Park, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 6 days.

(21) Appl. No.: 10/237,357

(22) Filed: Sep. 9, 2002

(65) Prior Publication Data

US 2003/0096929 A1 May 22, 2003

Related U.S. Application Data

(60) Provisional application No. 60/325,242, filed on Sep. 27, 2001.

(51) Int. Cl.[7] .................... C08F 220/10; C08F 20/22; C08F 220/22; C08F 230/08
(52) U.S. Cl. .................... 526/328.5; 526/89; 526/237; 526/243; 526/245; 526/248; 526/279; 526/318; 526/319; 526/328; 526/329.4; 526/329.5; 526/329.7
(58) Field of Search .................... 526/89, 237, 243, 526/245, 248, 279, 318, 319, 328, 328.5, 329.4, 329.5, 329.7

(56) References Cited

U.S. PATENT DOCUMENTS

| | | | |
|---|---|---|---|
| 3,407,247 A | 10/1968 | Reinhardt .................... 260/881 |
| 4,147,679 A | 4/1979 | Scriven et al. ........ 260/29.2 TN |
| 4,371,657 A | 2/1983 | Chang .......................... 524/512 |
| 4,396,680 A | 8/1983 | Chang .......................... 428/421 |
| 4,644,043 A | 2/1987 | Ohmori et al. .............. 526/246 |
| 4,665,144 A | 5/1987 | Ohmori et al. .............. 526/245 |
| 4,732,790 A | 3/1988 | Blackburn et al. ........ 427/407.1 |
| 4,798,746 A | 1/1989 | Claar et al. .............. 427/407.1 |
| 4,871,820 A | 10/1989 | Ohmori et al. .............. 526/245 |
| 5,026,621 A | 6/1991 | Tsubuko et al. ............ 430/109 |
| 5,049,622 A | 9/1991 | Abe ............................ 525/267 |
| 5,057,576 A | * 10/1991 | Spinelli ....................... 525/267 |
| 5,071,904 A | 12/1991 | Martin et al. ................ 524/458 |
| 5,177,165 A | * 1/1993 | Valint et al. ................ 526/245 |
| 5,283,148 A | 2/1994 | Rao ............................ 430/114 |
| 5,336,797 A | * 8/1994 | McGee et al. .............. 556/419 |
| 5,397,669 A | 3/1995 | Rao ............................ 430/108 |
| 5,478,886 A | 12/1995 | Kim ............................ 525/94 |
| 5,597,874 A | 1/1997 | Anton et al. ............. 525/331.2 |
| 5,629,372 A | 5/1997 | Anton et al. ................. 524/507 |
| 5,705,276 A | 1/1998 | Anton et al. ................. 428/421 |
| 5,763,548 A | 6/1998 | Matyjaszewski et al. ... 526/135 |
| 5,789,487 A | 8/1998 | Matyjaszewski et al. ... 525/301 |
| 5,807,937 A | 9/1998 | Matyjaszewski et al. ... 526/135 |
| 5,866,005 A | * 2/1999 | DeSimone et al. ......... 210/634 |
| 5,914,384 A | 6/1999 | Anton et al. ................... 528/83 |
| 5,948,851 A | 9/1999 | Anton et al. ................. 524/520 |
| 5,986,014 A | * 11/1999 | Kusakabe et al. .......... 525/342 |
| 5,986,015 A | 11/1999 | Midha et al. ................ 525/370 |
| 6,030,663 A | * 2/2000 | McClain et al. ......... 427/389.9 |
| 6,197,883 B1 | 3/2001 | Schimmel et al. .......... 525/111 |
| 6,319,988 B1 | * 11/2001 | Barkac et al. .............. 525/123 |
| 6,339,126 B1 | * 1/2002 | Barkac et al. ................. 525/66 |
| 6,365,666 B1 | * 4/2002 | McCollum et al. ......... 524/548 |
| 6,403,745 B1 | * 6/2002 | Scherer et al. .............. 526/319 |
| 6,479,584 B1 | * 11/2002 | Nakagawa et al. ......... 525/100 |
| 6,534,594 B1 | * 3/2003 | Kimura et al. .............. 525/100 |
| 6,552,118 B2 | * 4/2003 | Fujita et al. ................ 524/588 |

FOREIGN PATENT DOCUMENTS

| | | | |
|---|---|---|---|
| WO | WO 97/39072 | 10/1997 | ......... C09D/133/16 |
| WO | WO 98/40415 | 9/1998 | ............. C08F/4/10 |
| WO | WO 01/53366 | 7/2001 | ......... C08F/220/22 |

* cited by examiner

Primary Examiner—Jeffrey B. Robertson
(74) Attorney, Agent, or Firm—William J. Uhl

(57) ABSTRACT

The present invention is directed to a copolymer that includes a first radically polymerizable low surface tension (meth)acrylate monomer and one or more other radically polymerizable ethylenically unsaturated monomers. The copolymer has a polydispersity index of less than 2.5. The present invention further includes a controlled radical polymerization method to make the above described low surface tension containing copolymers. The method includes the steps of adding a first radically polymerizable low surface tension (meth)acrylate monomer and one or more other radically polymerizable ethylenically unsaturated monomers to a solution containing a suitable atom transfer radical polymerization (ATRP) initiator.

51 Claims, No Drawings

COPOLYMERS COMPRISING LOW SURFACE TENSION (METH) ACRYLATES

CROSS-REFERENCE TO RELATED APPLICATION

This application claims priority under 35 U.S.C. § 119 to Provisional Application Ser. No. 60/325,242, filed Sep. 27, 2001.

FIELD OF THE INVENTION

The present invention relates to novel (co)polymer compositions that contain low surface tension (meth)acrylates prepared by a controlled radical (co)polymerization process and thermosetting compositions containing the novel (co) polymers.

BACKGROUND OF THE INVENTION

Fluorocarbon-containing copolymers have been used as binding agents, wetting agents, surfactants and coating additives in a variety of applications. Fluorocarbon-containing copolymers made by conventional free radical polymerization methods have inevitable shortcomings as it is difficult to control their molecular weight distribution and composition in order to optimize their desired physical properties. For example, the common problem of poor control of molecular weight distribution can result in a high molecular weight "tail", which can give poor flow properties due to the high viscosity that results. Conversely, poor binding properties can result when too much of a low molecular weight "tail" is present.

U.S. Pat. Nos. 5,397,669 and 5,283,148 disclose an electrostatic liquid toner imaging process that uses a liquid toner comprised of a perfluorinated solvent and a polymer containing highly fluorinated units. The polymer was prepared using traditional free radical polymerization techniques and was characterized as having a polydispersity of 4.

U.S. Pat. No. 3,407,247 discloses fluoro olefin block copolymers prepared by traditional free radical polymerization of a (meth)acrylic monomer to form a prepolymer which is subsequently reacted with a fluoro olefin. While block copolymers were formed to some extent, the resulting block copolymers inherently vary widely in block length and molecular weight leading to a wide compositional variation and distribution as well as a large polydispersity.

U.S. Pat. No. 5,026,621 discloses a toner for electrophotography which includes a block copolymer binder resin comprised of a fluoroalkyl acryl ester block and a fluorine-free vinyl or olefin monomer block. The block copolymers were made using a unique peroxypolyether initiator, which is then used to initiate a first free radical polymerization, forming a peroxypolymer, which initiates a second free radical polymerization. While block copolymers are formed, the resulting block copolymers inherently vary widely in block length and molecular weight, as well as having a wide compositional variation, wide polymer composition distribution and a large polydispersity.

U.S. Pat. No. 5,478,886 discloses alkyl α-fluoroacrylate ester block copolymers prepared by group transfer polymerization techniques. The block copolymers have a polydispersity of less than 2 and do not contain any initiator residue. The disclosure is limited to fluoroacrylate monomers as the fluorocarbon monomer. These types of block copolymers are used primarily in the electronics industry as photoresists. The block copolymers are particularly subject to photodegradation.

U.S. Pat. Nos. 5,629,372; 5,705,276; and 5,914,384 disclose coating compositions comprising an alkyl (meth) acrylate/fluoroalkyl methacrylate random copolymer and a crosslinking agent. The materials disclosed were suggested for use as clear coating compositions for application over a pigmented base coat.

The use of conventional, i.e., non-living or free-radical (co)polymerization methods to synthesize (co)polymers provides little control over molecular weight, molecular weight distribution and, in particular, (co)polymer chain structure. In the example of fluoroalkyl methacrylate random copolymer described above, the potential surface tension effect of the fluoroalkyl methacrylate is muted as it is randomly dispersed along the polymer backbone.

U.S. Pat. Nos. 5,807,937, 5,789,487 and 5,763,548, and International Patent Publication Nos. WO 98/40415, WO 98/01480, WO 97/18247 and WO 96/30421 describe a radical polymerization process referred to as atom transfer radical polymerization (ATRP). The ATRP process is described as being a living radical polymerization that results in the formation of polymers having predictable molecular weight and molecular weight distribution. The ATRP process also is described as providing highly uniform products having controlled structure (i.e., controllable topology, composition, etc.). The '937 and '548 patents also describe (co)polymers prepared by ATRP, which are useful in a wide variety of applications including, for example, dispersants and surfactants.

A number of initiators and macroinitiator systems are known to support ATRP polymerization. These initiators are described, for example, in U.S. Pat. Nos. 5,807,937 and 5,986,015. U.S. Pat. No. 5,807,937 discloses a number of initiators, including halide groups attached to a primary carbon. Halides attached to primary carbons are known as efficient initiators in ATRP processes. U.S. Pat. No. 5,986, 015 discloses polymer macroinitiators prepared from vinyl chloride and another monomer, and their use in preparing graft (co)polymers with low polydispersity.

It also is desirable to have multiple initiation sites on an initiator in order to create unique branched (co)polymer structures, such as star (co)polymers. Such (co)polymers have a variety of practical applications, including as a resin component of a film-forming coating composition. These unique (co)polymers also will find use in the health care or cosmetics industries, for instance, as materials for bioengineering. (Co)polymers of low polydispersity (Mn/Mw) are also desirable not only for their structural regularity and related usefulness in producing defined block and gradient (co)polymer structures, but also for their unique physical characteristics. For instance, a star (co)polymer having low polydispersity is a high molecular weight material having low viscosity in solution.

There remains a need for copolymers that have reliable compositions and predictable molecular weight, polydispersity and surface tension lowering effect. Such copolymers can overcome the deficiencies of the copolymers of the prior art.

SUMMARY OF THE INVENTION

In accordance with the present invention, there is provided a copolymer that includes a low surface tension monomer and one or more other radically polymerizable ethylenically unsaturated monomers. The copolymer preferably has a polydispersity index of less than 2.5.

The present invention is also directed to a thermosetting composition which includes:

a non-gelled polymer which has functional monomers containing a functional group;

a crosslinking agent having at least two functional groups that are reactive with the functional groups of the non-gelled polymer; and a flow control agent which includes a copolymer, generally having a polydispersity index of less than 2.5, containing monomers that include one or more radically polymerizable low surface tension (meth)acrylate monomers and one or more other radically polymerizable ethylenically unsaturated monomers, where the low surface tension (meth)acrylate monomers are represented by the following formulas:

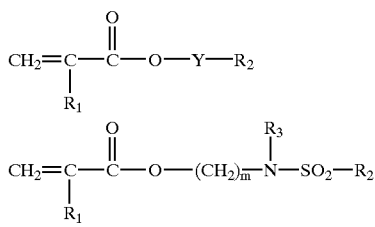

where $R_1$ is selected independently for each general formula from hydrogen, methyl and ethyl, $R_2$ is selected independently for each general formula from a fluorinated hydrocarbon group, a siloxane, a polysiloxane, an alkyl siloxane, an ethoxylated trimethylsilyl siloxane and a propoxylated trimethylsilyl siloxane. $R_2$ may contain from 4–20 carbon atoms, which can be linear, branched, cyclic, aryl or arylalkyl; Y is a divalent linking group containing from 1 to 20 carbon atoms and can be linear, branched, cyclic or aryl; m is an integer from 1 to 4; and $R_3$ is a $C_1$–$C_4$ alkyl.

The present invention is also directed to a method of coating a substrate, which includes the steps of:

applying the thermosetting composition of the present invention to a substrate;

coalescing the thermosetting composition over the substrate in the form of a substantially continuous film; and curing the thermosetting composition.

DETAILED DESCRIPTION OF THE PREFERRED EMBODIMENTS

Other than in the operating examples, or where otherwise indicated, all numbers or expressions referring to quantities of ingredients, reaction conditions, etc., used in the specification and claims are to be understood as modified in all instances by the term "about".

The terms (meth)acrylic and (meth)acrylate are meant to include both acrylic and methacrylic acid derivatives, such as the corresponding alkyl esters often referred to as acrylates and (meth)acrylates, which the term (meth)acrylate is meant to encompass.

The present invention is directed to a copolymer that includes a radically polymerizable low surface tension (meth)acrylate monomer and one or more other radically polymerizable ethylenically unsaturated monomers that are free of hydroxyl groups and amine group residues.

Any type of copolymer can be used in the present invention. Examples of copolymer architectures that can be used in the present invention include, but are not limited to random, block (including diblock, triblock and other multi-block architectures), alternating and gradient copolymers. The structure of the copolymers can generally be described by formulas I and II:

Where formula I represents a copolymer of controlled architecture, such as alternating, block or gradient and formula II represents a random copolymer. In formulas I and II, O represents one or more other radically polymerizable ethylenically unsaturated monomers that are free of hydroxyl groups and amine group residues; L represents a low surface tension (meth)acrylate monomer; p and q represent average numbers of monomer residues; and x represents the number of block sequences in a block copolymer. In general, p and q are integers representing the respective average number of monomer residues in a copolymer. The number of other monomers, p, can be from 1 to 1,000, preferably from 2 to 500 and most preferably from 3 to 250. The number of low surface tension (meth)acrylate monomers, q, can be from 1 to 200, preferably from 1 to 100 and most preferably from 1 to 50. The number of block sequences, x, can be from 1 to 1,000, preferably from 1 to 500 and most preferably from 1 to 100.

A preferred class of copolymers useful in the present invention are gradient copolymers. Gradient copolymers are copolymers that include one or more sequences of different classes of monomer residues that change gradually in a systematic and predictable manner along the polymer backbone. At an end of the polymer referred to as a tail, the gradient copolymer will contain predominantly the other radically polymerizable ethylenically unsaturated monomer(s) and another end, the head, will contain predominantly the radically polymerizable fluorocarbon (meth)acrylate monomer. The portions of the polymer backbone between the head and the tail will contain continuously changing proportions of the two classes of monomers. By way of illustration, the gradient copolymer of the present invention may have a structure as depicted in general structure III:

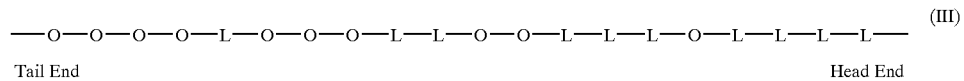

Tail End                  Head End where O represents one or more of the other radically polymerizable ethylenically unsaturated monomers and L represents a radically polymerizable low surface tension (meth)acrylate monomer.

By low surface tension (meth)acrylate monomer, what is meant is (meth)acrylate monomers that have highly surface active groups contained within the ester portion of the molecule. Examples of highly surface active groups include, but are not limited to, fluorides, silanes, siloxanes, (mono, di and tri) alkyl siloxanes and the like.

Any polymerizable low surface tension (meth)acrylate monomer can be used in the gradient copolymer of the present invention. Preferred low surface tension (meth)acrylate monomers are represented by formulas IV and V,

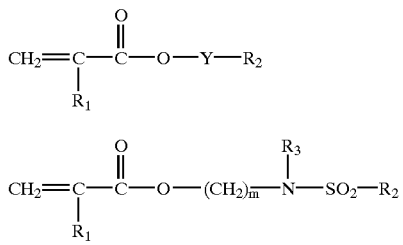

(IV)

(V)

wherein $R_1$ is selected independently for each general formula from hydrogen, methyl and ethyl, $R_2$ is selected independently for each general formula from a fluorinated hydrocarbon group, a siloxane, a polysiloxane, an alkyl siloxane, an ethoxylated trimethylsilyl siloxane and a propoxylated trimethylsilyl siloxane. $R_2$ may contain from 4–20 carbon atoms, which can be linear, branched, cyclic, aryl or arylalkyl; Y is a divalent linking group containing from 1 to 20 carbon atoms and can be linear, branched, cyclic or aryl; m is an integer from 1 to 4, preferably 1 to 3, and in an embodiment of the present invention m is 2; and $R_3$ is a $C_1$–$C_4$ alkyl.

When the group $R_2$ is a fluorinated alkyl group, it can be linear, branched or cyclic. The fluorinated hydrocarbon group $R_2$ can be described by general structure VI:

(VI)

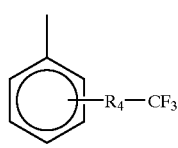

where $R_{34}$, $R_{35}$, $R_{36}$, $R_{37}$ and $R_{38}$ can each independently be H, F, and Cl to $C_6$ alkyl, as long as at least one occurrence of $R_{34}$, $R_{35}$, $R_{36}$, $R_{37}$ or $R_{38}$ is F; and d is an integer from 3 to 19.

When $R_2$ is a $C_1$–$C_{20}$ linear or branched alkyl group, one or more of the hydrogens are replaced with fluorine atoms. A non limiting example would be if $R_2$ were a propyl group, in which case it may be 3-fluoropropyl, 3,3-difluoropropyl, 3,3,3-trifluoropropyl, 1,2,3-trifluoropropyl, etc. When $R_2$ is a $C_1$–$C_{20}$ linear or branched cyclic group, one or more of the hydrogens are replaced with fluorine atoms. A non limiting example would be if $R_2$ were a cyclohexyl group, in which case it may be 3-fluorocyclohexyl, 3,3-difluorocyclohexyl, 1,2,3-trifluorocyclohexyl, 2,3,4,5-tetrafluorocyclohexyl, etc. When $R_2$ is a $C_1$–$C_{20}$ linear or branched aryl or arylalkyl group, one or more of the hydrogens are replaced with fluorine atoms. Non limiting examples of fluoroaryl and fluoroarylalkyl groups which can be part of the present gradient copolymer include those described by general structures VII–X:

(VII)

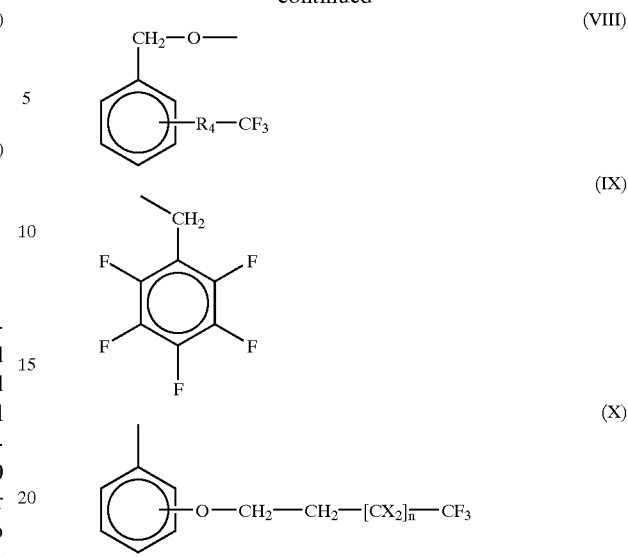

where $R_4$ is $C_1$–$C_4$ alkyl or alkynol, X is hydrogen or fluorine and n is an integer from 1 to 10.

Typically, useful perfluoroalkyl containing monomers are perfluoro methyl ethyl methacrylate, perfluoro ethyl ethyl methacrylate, perfluoro butyl ethyl methacrylate, perfluoro pentyl ethyl methacrylate, perfluoro hexyl ethyl methacrylate, perfluoro octyl ethyl methacrylate, perfluoro decyl ethyl methacrylate, perfluoro lauryl ethyl methacrylate, perfluoro stearyl ethyl methacrylate, perfluoro methyl ethyl acrylate, perfluoro ethyl ethyl acrylate, perfluoro butyl ethyl acrylate, perfluoro pentyl ethyl acrylate, perfluoro hexyl ethyl acrylate, perfluoro octyl ethyl acrylate, perfluoro decyl ethyl acrylate, perfluoro lauryl ethyl acrylate, perfluoro stearyl ethyl acrylate, trifluoromethyl benzyl acrylate, trifluoromethyl benzyl methacrylate, 1,1,1-trifluoropropyl benzyl acrylate methacrylate, 1,1,1-trifluoropropyl benzyl methacrylate ethyleneglycol perfluorophenyl ether acrylate, ethyleneglycol perfluorophenyl ether methacrylate, 1,1,1,2,2,3,3,4,4,5,5,6,6,7,7,8,8-hexadecafluorodecyl benzyl ether acrylate, 1,1,1,2,2,3,3,4,4,5,5,6,6,7,7,8,8-hexadecafluorodecyl benzyl ether methacrylate, and the like. Preferred are perfluoro alkyl ethyl methacrylates wherein the fluoroalkyl group contains 4–20 carbon atoms and benzyl ether acrylates and methacrylates of Zonyl® FTS fluorotelomer intermediate, Zonyl® FTS is a commercially available $C_9$–$C_{10}$ partially fluorinated alcohol from DuPont.

When $R_2$ includes a siloxane, it may be described by the following general structure XI:

(XI)

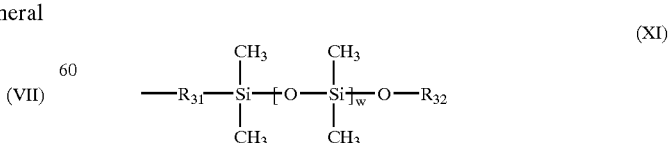

where $R_{31}$ is a linear, branched or cyclic $C_2$–$C_{18}$ alkyl or a polyether as in general formula XII:

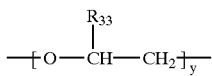

(XII)

where $R_{33}$ is a hydrogen, a halide or methyl and y is from 1 to 100, preferably from 1 to 50 and most preferably from 1 to 25 and $R_{32}$ is hydrogen, a linear, branched or cyclic $C_2$–$C_{18}$ alkyl or a trimethylsiloxane as in general structure XIII:

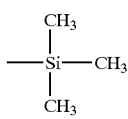

(XIII)

and w is from 0 to 500, preferably from 1 to 100 and most preferably from 1 to 50.

Typically, useful siloxane containing low surface tension (meth)acrylates include, but are not limited to, (meth)acryloxyalkyl terminated polydimethylsiloxanes, such as those available as MCR-M11 and MCR-M17 from Gelest, Inc., Tullytown, Pa. and X-22-174DX and X-22-2426 available as X-22-174DX from Shin-Etsu Chemical Co., Ltd., Tokyo, Japan; (meth)acryloxyalkyl tris(trimethylsiloxy silane), such as that available as X-22-174DX from Shin-Etsu Chemical Co.; and (meth)acryloxyalkyl trimethylsiloxy terminated polyethylene oxide such as that available as SIM0479.0 from Gelest, Inc.

In the copolymer of the present invention, the copolymer will contain the low surface tension (meth)acrylate monomer in an amount up to 5 wt. %, preferably from 0.01 wt. % to 5 wt. %, more preferably from 0.1 wt. % to 5 wt. % and most preferably from 1 wt. % to 3 wt. % based on the total weight of the copolymer. The ethylenically unsaturated monomers are present in an amount of at least 95 wt. %, preferably from 95 wt. % to 99.99 wt. %, more preferably from 95 wt. % to 99.9 wt. % and most preferably from 97 wt. % to 99 wt. % based on the total weight of the copolymer.

A third monomer may also be included in the copolymer. In the case of a gradient copolymer, the portions of the polymer backbone between the head and the tail will contain continuously changing proportions of the three monomers. By way of illustration, a gradient copolymer containing three different monomer compositions may have a structure as depicted in general structure XIV:

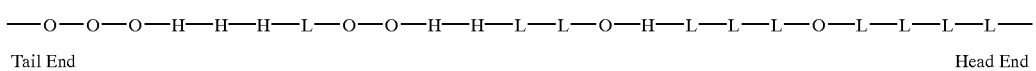

(XIV)

Tail End                                                                                                    Head End where O represents one or more of the other radically polymerizable ethylenically unsaturated monomers, H represents the third monomer or monomer composition and L represents a radically polymerizable low surface tension (meth)acrylate monomer.

The third monomer can be present in an amount of from 0 wt. % to 75 wt. %, preferably from 20 wt. % to 75 wt. % and most preferably from 35 wt. % to 65 wt. % based on the total weight of the copolymer. When the third monomer is present, the amount of each block will be from 0.01 to 5 wt. %, more preferably from 0.1 wt. % to 5 wt. % based and most preferably from 1 to 3 wt. % of the first low surface tension (meth)acrylate monomer, from 25 wt. % to 75 wt. %, more preferably from 30 wt. % to 70 wt. % and most preferably from 35 wt. % to 65 wt. % of the other radically polymerizable ethylenically unsaturated monomers, and from 20 wt. % to 74.99 wt. %, more preferably from 25 wt. % to 69.9 wt. % and most preferably from 32 wt. % to 64 wt. % of the third monomer based on the total weight of the copolymer.

Optionally, the other ethylenically unsaturated monomer and third monomer may include a hydroxyl functional monomer. The hydroxy functional monomer can be present in at least one of the other polymerizable ethylenically unsaturated monomer or third monomer in an amount of from 0.01 wt. % to 5 wt. %, preferably from 0.05 wt. % to 4 wt. % and most preferably from 0.1 wt. % to 3 wt. % based on the total weight of the copolymer.

The other radically polymerizable ethylenically unsaturated monomer and third monomer can be any radically polymerizable alkylene containing a polar group. The preferred monomers are ethylenically unsaturated monomers and include monomers having general structure XV:

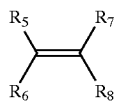

(XV)

where $R_5$, and $R_6$ are independently selected from the group consisting of H, halogen, CN, straight or branched alkyl of 1 to 20 carbon atoms (preferably from 1 to 6 carbon atoms, more preferably from 1 to 4 carbon atoms), aryl, unsaturated straight or branched alkenyl or alkynyl of 2 to 10 carbon atoms (preferably from 2 to 6 carbon atoms, more preferably from 2 to 4 carbon atoms), unsaturated straight or branched alkenyl of 2 to 6 carbon atoms (preferably vinyl) substituted (preferably at the α-position) with a halogen (preferably chlorine), $C_3$–$C_8$ cycloalkyl, heterocyclyl, phenyl which may optionally have from 1–5 substituents on the phenyl ring, $C(=Y)R_9$, $C(=Y)NR_{10}R_{11}$, $YCR_{10}R_{11}R_{12}$ and $YC(=Y)R_{12}$, where Y may be $NR_{13}$ or O (preferably O), $R_9$ is alkyl of from 1 to 20 carbon atoms, alkoxy of from 1 to 20 carbon atoms, aryloxy or heterocyclyloxy, $R_{10}$ and $R_{11}$ are independently H or alkyl of from 1 to 20 carbon atoms, or $R_{10}$ and $R_{11}$ may be joined together to form an alkylene group of from 2 to 5 carbon atoms, thus forming a 3- to 6-membered ring, and $R_{12}$ is H, straight or branched $C_1$–$C_{20}$, alkyl and aryl; and $R_7$ is selected from the group consisting of H, halogen (preferably fluorine or chlorine), $C_1$–$C_6$ (preferably $C_1$) alkyl, CN, $COOR_{14}$ (where $R_{14}$ is H, an alkali metal, or a $C_1$–$C_6$ alkyl group) or aryl; or $R_5$ and $R_7$ may be joined to form a group of the formula $(CH_2)_{n'}$ (which may be substituted with from 1 to 2n' halogen atoms or $C_1$–$C_4$ alkyl groups) or $C(=O)$—Y—$C(=O)$, where n' is from 2 to 6 (preferably 3 or 4) and Y is as defined above; and $R_8$ is the same as $R_5$ or $R_6$ or optionally $R_8$ is a CN group; at least two of $R_5$, $R_6$, and $R_7$ are H or halogen.

Specific examples of ethylenically unsaturated monomers that the copolymer of the present invention may contain include ethylenically unsaturated monomers, allylic monomers, olefins (meth)acrylic acid, (meth)acrylates, (meth)acrylamide, N- and N,N-di-substituted (meth) acrylamides, vinyl aromatic monomers, vinyl halides, vinyl esters of carboxylic acids and mixtures thereof. More specific examples of suitable monomers include, without limitation, $C_1$–$C_{20}$ alkyl (meth)acrylates (including linear or branched alkyls and cycloalkyls) which include, but are not limited to, methyl (meth)acrylate, ethyl (meth)acrylate, propyl (meth)acrylate, isopropyl (meth)acrylate, n-butyl (meth) acrylate, iso-butyl (meth)acrylate, tert-butyl (meth)acrylate, 2-ethylhexyl (meth)acrylate, lauryl (meth)acrylate, isobornyl (meth)acrylate, cyclohexyl (meth)acrylate, 3,3,5-trimethylcyclohexyl (meth)acrylate and isooctane (meth) acrylate; oxirane functional (meth)acrylates which include, but are not limited to, glycidyl (meth)acrylate, 3,4-epoxycyclohexylmethyl(meth)acrylate, and 2-(3,4-epoxycyclohexyl) ethyl(meth)acrylate; hydroxy alkyl (meth)acrylates having from 2 to 4 carbon atoms in the alkyl group which include, but are not limited to, hydroxyethyl (meth)acrylate, hydroxypropyl (meth)acrylate and hydroxybutyl (meth)acrylate. The residues may each independently be residues of monomers having more than one (meth) acryloyl group, such as (meth)acrylic anhydride, diethyleneglycol bis(meth)acrylate, 4,4'-isopropylidenediphenol bis(meth)acrylate (Bisphenol A di(meth)acrylate), alkoxylated 4,4'-isopropylidenediphenol bis(meth)acrylate, trimethylolpropane tris(meth)acrylate and alkoxylated trimethylolpropane tris(meth)acrylate.

In the context of the present application, the terms "alkyl", "alkenyl" and "alkynyl" refer to straight-chain or branched groups. Furthermore, in the present application, "aryl" refers to phenyl, naphthyl, phenanthryl, phenalenyl, anthracenyl, triphenylenyl, fluoranthenyl, pyrenyl, pentacenyl, chrysenyl, naphthacenyl, hexaphenyl, picenyl and perylenyl (preferably phenyl and naphthyl), in which each hydrogen atom may be replaced with alkyl of from 1 to 20 carbon atoms (preferably from 1 to 6 carbon atoms and more preferably methyl), alkyl of from 1 to 20 carbon atoms (preferably from 1 to 6 carbon atoms and more preferably methyl) in which each of the hydrogen atoms is independently replaced by a halide (preferably a fluoride or a chloride), alkenyl of from 2 to 20 carbon atoms, alkynyl of from 1 to 20 carbon atoms, alkoxy of from 1 to 6 carbon atoms, alkylthio of from 1 to 6 carbon atoms, $C_3$–$C_8$ cycloalkyl, phenyl, halogen, $NH_2$, $C_1$–$C_6$-alkylamino, $C_1$–$C_6$-dialkylamino, and phenyl which may be substituted with from 1 to 5 halogen atoms and/or $C_1$–$C_4$ alkyl groups. (This definition of "aryl" also applies to the aryl groups in "aryloxy" and "aralkyl.") Thus, phenyl may be substituted from 1 to 5 times and naphthyl may be substituted from 1 to 7 times (preferably, any aryl group, if substituted, is substituted from 1 to 3 times) with one of the above substituents. More preferably, "aryl" refers to phenyl, naphthyl, phenyl substituted from 1 to 5 times with fluorine or chlorine, and phenyl substituted from 1 to 3 times with a substituent selected from the group consisting of alkyl of from 1 to 6 carbon atoms, alkoxy of from 1 to 4 carbon atoms and phenyl. Most preferably, "aryl" refers to phenyl and tolyl.

Specific examples of vinyl aromatic monomers that may be used to prepare the (co)polymer include, but are not limited to, styrene, p-chloromethyl styrene, divinyl benzene, vinyl naphthalene and divinyl naphthalene. Vinyl halides that may be used to prepare the graft co(co)polymer include, but are not limited to, vinyl chloride, p-chloromethylstyrene, vinyl chloroacetate and vinylidene fluoride. Vinyl esters of carboxylic acids that may be used to prepare the (co) polymer include, but are not limited to, vinyl acetate, vinyl butyrate, vinyl 3,4-dimethoxybenzoate and vinyl benzoate.

In the context of the present invention, "heterocyclyl" refers to pyridyl, furyl, pyrrolyl, thienyl, imidazolyl, pyrazolyl, pyrazinyl, pyrimidinyl, pyridazinyl, pyranyl, indolyl, isoindolyl, indazolyl, benzofuryl, isobenzofuryl, benzothienyl, isobenzothienyl, chromenyl, xanthenyl, purinyl, pteridinyl, quinolyl, isoquinolyl, phthalazinyl, quinazolinyl, quinoxalinyl, naphthyridinyl, phenoxathiinyl, carbazolyl, cinnolinyl, phenanthridinyl, acridinyl, 1,10-phenanthrolinyl, phenazinyl, phenoxazinyl, phenothiazinyl, oxazolyl, thiazolyl, isoxazolyl, isothiazolyl, and hydrogenated forms thereof known to those in the art. Preferred heterocyclyl groups include pyridyl, furyl, pyrrolyl, thienyl, imidazolyl, pyrazolyl, pyrazinyl, pyrimidinyl, pyridazinyl, pyranyl and indolyl, the most preferred heterocyclyl group being pyridyl. Accordingly, suitable vinyl heterocycles to be used as a monomer in the present invention include 2-vinyl pyridine, 4-vinyl pyridine, 2-vinyl pyrrole, 3-vinyl pyrrole, 2-vinyl oxazole, 4-vinyl oxazole, 5-vinyl oxazole, 2-vinyl thiazole, 4-vinyl thiazole, 5-vinyl thiazole, 2-vinyl imidazole, 4-vinyl imidazole, 3-vinyl pyrazole, 4-vinyl pyrazole, 3-vinyl pyridazine, 4-vinyl pyridazine, 3-vinyl isoxazole, 3-vinyl isothiazoles, 2-vinyl pyrimidine, 4-vinyl pyrimidine, 5-vinyl pyrimidine, and any vinyl pyrazine, the most preferred being 2-vinyl pyridine. The vinyl heterocycles mentioned above may bear one or more (preferably 1 or 2) $C_1$–$C_6$ alkyl or alkoxy groups, cyano groups, ester groups or halogen atoms, either on the vinyl group or the heterocyclyl group, but preferably on the heterocyclyl group. Further, when the above-mentioned vinyl heterocycles are unsubstituted, they may contain an N—H group which may be protected at that position with a conventional blocking or protecting group, such as a $C_1$–$C_6$ alkyl group, a tris-$C_1$–$C_6$ alkylsilyl group, an acyl group of the formula $R_{15}$ CO (where $R_{15}$ is alkyl of from 1 to 20 carbon atoms, in which each of the hydrogen atoms may be independently replaced by halide, preferably fluoride or chloride), alkenyl of from 2 to 20 carbon atoms (preferably vinyl), alkynyl of from 2 to 10 carbon atoms (preferably acetylenyl), phenyl which may be substituted with from 1 to 5 halogen atoms or alkyl groups of from 1 to 4 carbon atoms, or aralkyl (aryl-substituted alkyl, in which the aryl group is phenyl or substituted phenyl and the alkyl group is from 1 to 6 carbon atoms), etc. (This definition of "heterocyclyl" also applies to the heterocyclyl groups in "heterocyclyloxy" and "heterocyclic ring.")

More specifically, preferred monomers include, but are not limited to, styrene, p-chloromethylstyrene, vinyl chloroacetate, acrylate and methacrylate esters of $C_1$–$C_{20}$ alcohols, isobutene, 2-(2-bromopropionoxy) ethyl acrylate, acrylonitrile, and methacrylonitrile.

As used herein and in the claims, by "allylic monomer(s)" is meant monomers containing substituted and/or unsubstituted allylic functionality, i.e., one or more radicals represented by the following general formula XVI,

$$H_2C=C(R_{16})—CH_2— \hspace{2cm} (XVI)$$

where $R_{16}$ is hydrogen, halogen or a $C_1$ to $C_4$ alkyl group. Most commonly, $R_{16}$ is hydrogen or methyl and consequently general formula XVI represents the unsubstituted (meth)allyl radical. Examples of allylic monomers may each independently be residues of, but are not limited to, (meth) allyl ethers, such as methyl (meth)allyl ether and (meth)allyl glycidyl ether; allyl esters of carboxylic acids, such as (meth)allyl acetate, (meth)allyl butyrate, (meth)allyl 3,4-dimethoxybenzoate and (meth)allyl benzoate.

Other ethylenically unsaturated radically polymerizable monomers that may be used to prepare the copolymer include, but are not limited to: cyclic anhydrides, e.g., maleic anhydride, 1-cyclopentene-1,2-dicarboxylic anhydride and itaconic anhydride; esters of acids that are unsaturated but do not have α,β-ethylenic unsaturation, e.g., methyl ester of undecylenic acid; diesters of ethylenically unsaturated dibasic acids, e.g., di($C_1$–$C_4$ alkyl)ethyl maleates; maleimide and N-substituted maleimides.

In an embodiment of the present invention, the ethylenically unsaturated monomers include a hydrophobic residue of a monomer selected from oxirane functional monomer reacted with a carboxylic acid selected from the group consisting of aromatic carboxylic acids, polycyclic aromatic carboxylic acids, aliphatic carboxylic acids having from 6 to 20 carbon atoms and mixtures thereof: $C_6$–$C_{20}$ alkyl (meth) acrylates, e.g., including those as previously recited herein; aromatic (meth)acrylates, e.g., phenyl (meth)acrylate, p-nitrophenyl (meth)acrylate and benzyl (meth)acrylate; polycyclicaromatic (meth)acrylates, e.g., 2-naphthyl (meth) acrylate; vinyl esters of carboxylic acids, e.g., hexanoic acid vinyl ester and decanoic acid vinyl ester; N,N-di($C_1$–$C_8$ alkyl) (meth)acrylamides; maleimide; N—($C_1$–$C_{20}$ alkyl) maleimides; N—($C_3$–$C_8$ cycloalkyl) maleimides; N-(aryl) maleimides; and mixtures thereof. Examples of N-substituted maleimides include, but are not limited to, N—($C_1$–$C_{20}$ linear or branched alkyl) maleimides, e.g., N-methyl maleimide, N-tertiary-butyl maleimide, N-octyl maleimide and N-icosane maleimide; N—($C_3$–$C_8$ cycloalkyl) maleimides, e.g., N-cyclohexyl maleimide; and N-(aryl) maleimides, e.g., N-phenyl maleimide, N—($C_1$–$C_9$ linear or branched alkyl substituted phenyl) maleimide, N-benzyl maleimide and N—($C_1$–$C_9$ linear or branched alkyl substituted benzyl) maleimide.

The oxirane functional monomer or its residue that is reacted with a carboxylic acid, may be selected from, for example, glycidyl (meth)acrylate, 3,4-epoxycyclohexylmethyl (meth)acrylate, 2-(3,4-epoxycyclohexyl)ethyl (meth)acrylate, allyl glycidyl ether and mixtures thereof. Examples of carboxylic acids that may be reacted with the oxirane functional monomer or its residue include, but are not limited to, para-nitrobenzoic acid, hexanoic acid, 2-ethyl hexanoic acid, decanoic acid, undecanoic acid and mixtures thereof.

The monomer containing at least one polar group may be present in an amount up to 5 wt % by weight based on the total amount of monomers. A preferred amount of the monomer containing at least one polar group is 0.01 to 5 wt %; the most preferred amount is 0.1 to 3 wt % based on the total amount of monomers.

The copolymer of the present invention may be prepared by any technique known in the art. For example, the copolymer may be prepared by conventional free radical polymerization methods using thermal initiators such as peroxides or diazzonium or "azo" containing compounds. Conventional free radical polymerizations may also be accomplished by art recognized methods of using oxidation-reduction reactions of, for example persulfate with bisulfite or various transition metals.

A preferred method of preparing the copolymer of the present invention is by controlled radical polymerization. As used herein and in the claims, the term "controlled radical polymerization," and related terms, e.g., "living radical polymerization," refer to those methods of radical polymerization that provide control over the molecular weight, molecular weight distribution, polydispersity and polymer chain architecture. A controlled or living radical polymerization is also described as a chain-growth polymerization that propagates with essentially no chain transfer and essentially no chain termination. The number of living polymer chains formed during a controlled radical polymerization is often nearly equal to the number of initiators present at the beginning of the reaction. Each living polymer chain typically contains a residue of the initiator at what is commonly referred to as its tail, and a residue of the radically transferable group at what is commonly referred to as its head.

In an embodiment of the present invention, the copolymer is prepared by atom transfer radical polymerization (ATRP). The ATRP process comprises: (co)polymerizing one or more ethylenically unsaturated polymerizable monomers in the presence of a specific initiation system; forming a (co) polymer; and isolating the formed (co)polymer.

In preparing the copolymer of the present invention by ATRP, the initiator may be selected from linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds and mixtures thereof, each having at least one radically transferable group, which is typically a halo group. The initiator may also be substituted with functional groups such as oxyranyl groups, which include glycidyl groups. Additional useful initiators and the various radically transferable groups that may be associated with them (cyano, cyanato, thiocyanato, and azide groups, for example) are described in U.S. Pat. No. 5,807,937 at column 17, line 4 through column 18, line 28.

Polymeric compounds (including oligomeric compounds) having radically transferable groups may be used as ATRP initiators, and are herein referred to as "macroinitiators". Examples of macroinitiators include, but are not limited to, polystyrene prepared by cationic polymerization and having a terminal halide (chloride, for example), and a polymer of 2-(2-bromopropionoxy) ethyl acrylate and one or more alkyl (meth)acrylates (butyl acrylate, for example) prepared by conventional non-living radical polymerization. Macroinitiators can be used in the ATRP process to prepare graft polymers, such as grafted copolymers and comb copolymers. A further discussion of macroinitiators is found in U.S. Pat. No. 5,789,487 at column 13, line 27 through column 18, line 58.

Preferably, the ATRP initiator may be selected from halomethane, methylenedihalide, haloform, carbon tetrahalide (carbon tetrachloride, for example), 1-halo-2,3-epoxypropane, methanesulfonyl halide, p-toluenesulfonyl halide, methanesulfenyl halide, p-toluenesulfenyl halide, 1-phenylethyl halide, $C_1$–$C_6$-alkyl ester of 2-halo-$C_1$–$C_6$-carboxylic acid, p-halomethylstyrene, monohexakis (α-halo-$C_1$–$C_6$-alkyl) benzene, diethyl-2-halo-2-methyl malonate and mixtures thereof. Particularly preferred ATRP initiators are diethyl-2-bromo-2-methyl malonate and p-toluenesulfonyl chloride.

Although the prior art teaches the specific use of halogenated hydrocarbons as preferred initiators for ATRP processes, it has been found as part of the present invention that when fluorocarbon ester (meth)acrylates are used, the C—F bond is too strong and the fluorine atoms, although halogens, do not participate as radically transferable groups in the ATRP process. These monomers are further distinguished from other halogenated monomers in their resistance to photodegradation.

Catalysts that may be used in the ATRP preparation of the copolymer of the present invention include any transition metal compound that can participate in a redox cycle with the initiator and the growing polymer chain. It is preferred that the transition metal compound not form direct carbon-metal bonds with the polymer chain. Transition metal catalysts useful in the present invention may be represented by the following formula XVII:

$$TM^{n+}X_n \qquad (XVII)$$

where TM is the transition metal, n is the formal charge on the transition metal having a value of from 0 to 7, and X is a counterion or covalently bonded component. Examples of the transition metal include, but are not limited to, Cu, Fe, Au, Ag, Hg, Pd, Pt, Co, Mn, Ru, Mo, Nb and Zn. Examples of X include, but are not limited to, halide, hydroxy, oxygen, $C_1$–$C_6$-alkoxy, cyano, cyanato, thiocyanato and azido. A preferred transition metal is Cu(I) and X is preferably halide, e.g., chloride. Accordingly, a preferred class of transition metal catalysts are the copper halides, e.g., Cu(I)Cl. It is also preferred that the transition metal catalyst contain a small amount, e.g., 1 mole percent, of a redox conjugate, for example, Cu(II)$Cl_2$ when Cu(I)Cl is used. Additional catalysts useful in preparing the copolymer are described in U.S. Pat. No. 5,807,937 at column 18, lines 29 through 56. Redox conjugates are described in further detail in U.S. Pat. No. 5,807,937 at column 11, line 1 through column 13, line 38.

Ligands that may be used in the ATRP preparation of the copolymer include, but are not limited to, compounds having one or more nitrogen, oxygen, phosphorus and/or sulfur atoms, which can coordinate to the transition metal catalyst compound, e.g., through sigma and/or pi bonds. Classes of useful ligands include, but are not limited to, unsubstituted and substituted pyridines and bipyridines; porphyrins; cryptands; crown ethers; e.g., 18-crown-6; polyamines, e.g., ethylenediamine; glycols, e.g., alkylene glycols, such as ethylene glycol; carbon monoxide; and coordinating monomers, e.g., styrene, acrylonitrile and hydroxyalkyl (meth)acrylates. As used herein and in the claims, the term "(meth)acrylate" and similar terms refer to acrylates, methacrylates, and mixtures of acrylates and methacrylates. A preferred class of ligands is the substituted bipyridines, e.g., 4,4'-dialkyl-bipyridyls. Additional ligands that may be used in preparing the (co)polymer are described in U.S. Pat. No. 5,807,937 at column 18, line 57 through column 21, line 43.

The initiator includes one or more halide-containing initiation sites that are primarily connected by aliphatic carbons. The connecting aliphatic carbons may include aromatic residues. However, to avoid susceptibility to UV degradation, aromatic moieties are generally avoided. The avoidance of aromatic moieties also isolates each. Typically, the connecting carbons are aliphatic (free from aromatic moieties). The initiator sites are also preferably "symmetrical". By "symmetrical" it is meant that the $K_i$ (initiation constant) for each initiation site and typically the $K_p$ (propagation constant) are substantially the same. By "isolated" it is meant that the $K_i$ and $K_p$ for each initiation site are not affected substantially by the initiation and propagation of polymerization on a second initiation site on the same initiator.

In preparing the copolymer by ATRP methods, the molar ratio of transition metal compound to initiator is typically in the range of $10^{-4}$:1 to 10:1, for example, 0.1:1 to 5:1. The molar ratio of ligand to transition metal compound is typically within the range of 0.1:1 to 100:1, for example, 0.2:1 to 10:1.

The copolymer may be prepared in the absence of solvent, i.e., by means of a bulk polymerization process. Generally, the copolymer is prepared in the presence of a solvent, typically an organic solvent. Classes of useful organic solvents include, but are not limited to, esters of carboxylic acids, ethers, cyclic ethers, $C_1$–$C_{10}$ alkanes, $C_1$–$C_8$ cycloalkanes, aromatic hydrocarbon solvents, amides, nitriles, sulfoxides, sulfones and mixtures thereof. Supercritical solvents, such as $CO_2$, $C_1$–$C_4$ alkanes and fluorocarbons, may also be employed. A preferred class of solvents is the aromatic hydrocarbon solvents, particularly preferred examples of which are xylene, toluene, and mixed aromatic solvents such as those commercially available from Exxon Chemical America under the trademark SOLVESSO. Additional solvents are described in further detail in U.S. Pat. No. 5,807,937 at column 21, line 44 through column 22, line 54.

The ATRP preparation of the copolymer is typically conducted at a reaction temperature within the range of 25° C. to 140° C., preferably from 50° C. to 100° C., and a pressure within the range of 1 to 100 atmospheres, usually at ambient pressure. The atom transfer radical polymerization is typically completed in less than 24 hours, preferably between 1 and 8 hours.

The ATRP transition metal catalyst and its associated ligand are typically separated or removed from the copolymer product prior to its use. Removal of the ATRP catalyst may be achieved using known methods, including, for example, adding a catalyst binding agent to the mixture of the copolymer, solvent and catalyst, followed by filtering. Examples of suitable catalyst binding agents include, for example, alumina, silica, clay or a combination thereof. A mixture of the copolymer, solvent and ATRP catalyst may be passed through a bed of catalyst binding agent. Alternatively, the ATRP catalyst may be oxidized in situ, the oxidized residue of the catalyst being retained in the copolymer.

The copolymers of the present invention include a variety of structures, depending upon the structure of the initiator, the monomers used in propagating the copolymer, the reaction conditions and the method of termination of the polymerization process. The copolymers of the present invention may have star-like structures when the copolymers are produced by propagating a polymer chain on the above-described poly-functional initiator (three or more initiation sites). Linear copolymers can be prepared through the use of mono- or di-functional initiators.

The initiators may include active hydrogen-containing groups to permit crosslinking of the initiator by known crosslinking methods. The initiator may include other functionality, such as an ionic group or a group that can be converted into an ionic group, such as a quaternary amine group or a sulfonium group. An ionic group-containing copolymer prepared in such a manner can be useful as a component of an electrodepositable film-forming composition for use in preparing a coating layer on an electroconductive substrate. The initiator may further contain an active group that permits grafting of other groups to the copolymer, such as polymer chains that cannot be prepared by a controlled radical polymerization process. An example of such a chain is a polyoxyalkylene chain, which may be useful in solubilizing the copolymer, depending upon the intended use for the copolymer.

The choice of monomers used in preparing the copolymer also is an important factor in determining the structure of the copolymer. Gradient polymers can be produced by chain propagation with a sequence of different monomers. The use of hydrophilic monomers (i.e., a poly(alkylene glycol) (meth)acrylate or hydrophobic monomers, i.e., an alkyl (meth)acrylate) will dictate the hydrophobicity and hydrophilicity of defined portions of the copolymer structure. The use of active hydrogen-containing monomers, i.e., a hydroxyalkyl (meth)acrylate or a (meth)acrylamide, will dictate the reactivity of portions of the (co)polymer to crosslinkers and/or other co-reactive group-containing materials.

As described above, the copolymer may have nonionic moieties, ionic moieties and combinations thereof. In an embodiment of the present invention, the ethylenically unsaturated monomers can be selected from, for example, poly(alkylene glycol) (meth)acrylates; $C_1$–$C_4$ alkoxy poly (alkylene glycol) (meth)acrylates; hydroxyalkyl (meth) acrylates having from 2 to 4 carbon atoms in the alkyl group; N-(hydroxy $C_1$–$C_4$ alkyl) (meth)acrylamides, e.g., N-hydroxymethyl (meth)acrylamide and N-(2-hydroxyethyl) (meth)acrylamide; N,N-di-(hydroxy $C_1$–$C_4$ alkyl) (meth)acrylamides (e.g., N,N-di(2-hydroxyethyl) (meth)acrylamide); carboxylic acid functional monomers; salts of carboxylic acid functional monomers; amine functional monomers; salts of amine functional monomers; and mixtures thereof.

Poly(alkylene glycol) (meth)acrylates and $C_1$–$C_4$ alkoxy poly(alkylene glycol) (meth)acrylates are prepared by known methods. For example, (meth)acrylic acid or hydroxyalkyl (meth)acrylate, e.g., 2-hydroxyethyl (meth) acrylate, may be reacted with one or more alkylene oxides, e.g., ethylene oxide, propylene oxide and butylene oxide. Alternatively, an alkyl (meth)acrylate may be transesterified with a $C_1$–$C_4$ alkoxy poly(alkylene glycol), e.g., methoxy poly(ethylene glycol). Examples of poly(alkylene glycol) (meth)acrylates and $C_1$–$C_4$ alkoxy poly(alkylene glycol) (meth)acrylates include poly(ethylene glycol) (meth) acrylate and methoxy poly(ethylene glycol) (meth)acrylate, the poly(ethylene glycol) moiety of each having a molecular weight of from 100 to 800. An example of a commercially available $C_1$–$C_4$ alkoxy poly(alkylene glycol) (meth) acrylate is methoxy poly(ethylene glycol) 550 methacrylate monomer from Sartomer Company, Inc. Preferred hydroxy functional monomer are hydroxyalkyl (meth)acrylates having from 2 to 20 carbon atoms in the alkyl group; epoxide functional ethylenically unsaturated radically polymerizable monomers, which are hydrolyzed; hydroxyalkyl (meth) acrylates having from 2 to 20 carbon atoms in the alkyl group, which are reacted with a lactone; beta-hydroxy ester functional (meth)acrylates, which are the reaction product of (i) (meth)acrylic acid and a glycidyl ester of a saturated monocarboxylic acid having from 4 to 26 carbon atoms, or (ii) glycidyl (meth)acrylate and a saturated monocarboxylic acid having from 4 to 26 carbon atoms; and mixtures thereof. Examples of carboxylic acid functional ethylenically unsaturated monomers include, but are not limited to, (meth)acrylic acid, maleic acid, and fumaric acid. The monomer may be a residue of a precursor of a carboxylic acid functional monomer that is converted to a carboxylic acid residue after completion of the controlled radical (co) polymerization, e.g., maleic anhydride, di($C_1$–$C_4$ alkyl) maleates and $C_1$–$C_4$ alkyl (meth)acrylates. For example, residues of maleic anhydride can be converted to diacid residues, ester/acid residues or amide/acid residues by art-recognized methods. Residues of $C_1$–$C_4$ alkyl (meth) acrylates, such as t-butyl methacrylate, can be converted to (meth)acrylic acid residues by art-recognized methods. Salts of carboxylic acid functional monomers include, for example, salts of (meth)acrylic acid and primary, secondary or tertiary amines, such as, butyl amine, dimethyl amine and triethyl amine.

Amine functional monomers include, for example, amino ($C_2$–$C_4$ alkyl) (meth)acrylates, e.g., 2-aminoethyl (meth) acrylate, 3-aminopropyl (meth)acrylate and 4-aminobutyl (meth)acrylate; N—($C_1$–$C_4$ alkyl)amino($C_2$–$C_4$ alkyl) (meth)acrylates, e.g., N-methyl-2-aminoethyl (meth) acrylate; N,N-di($C_1$–$C_4$ alkyl)amino ($C_2$–$C_4$ alkyl) (meth) acrylates, e.g., N,N-dimethyl-2-aminoethyl (meth)acrylate; and N,N-di($C_1$–$C_4$ alkyl)aminoethyl (meth)acrylates. The monomer may also comprise residues of salts of amine functional monomers, e.g., salts of those amine functional monomers as recited previously herein. Salts of the amine functional monomer residues may be formed by mixing a carboxylic acid, e.g., lactic acid, with the (co)polymer after completion of controlled radical (co)polymerization.

In an embodiment of the present invention, the copolymer can contain a segment that includes carboxylic acid functional monomers selected from (meth)acrylic acid, maleic anhydride, maleic acid, di($C_1$–$C_4$ alkyl) maleates, and mixtures thereof. In a still further embodiment of the present invention, the (co)polymer segment is a residue of amine functional monomers selected from amino($C_2$–$C_4$ alkyl) (meth)acrylates, N—($C_1$–$C_4$ alkyl)amino($C_2$–$C_4$ alkyl) (meth)acrylates, N,N-di($C_1$–$C_4$ alkyl)amino($C_2$–$C_4$ alkyl) (meth)acrylates and mixtures thereof.

The copolymer also may contain a segment that contains cationic moieties selected from ammonium, sulphonium and phosphonium. Ammonium, sulphonium and phosphonium moieties may be introduced into the copolymer by means known to the skilled artisan. For example, when the copolymer contains a residue of N,N-dimethyl-2-aminoethyl (meth)acrylate, the N,N-dimethylamino moieties may be converted to ammonium moieties by mixing an acid, e.g., lactic acid, with the polymer.

When the segment of the copolymer contains residues of oxirane functional monomers, such as glycidyl (meth) acrylate, the oxirane groups may be used to introduce sulphonium or phosphonium moieties into the polymer. Sulphonium moieties may be introduced into the polymer by reaction of the oxirane groups with thiodiethanol in the presence of an acid, such as lactic acid. Reaction of the oxirane groups with a phosphine, e.g., triphenyl phosphine or tributyl phosphine, in the presence of an acid, such as lactic acid, results in the introduction of phosphonium moieties into the graft (co) polymer.

The preferred architecture of the present invention is a gradient architecture. Gradient architecture refers to a sequence of different monomer residues that changes gradually in a systematic and predictable manner along the polymer backbone as shown in structure XVIII.

(XVIII) Gradient Architecture

-(MMA-MMA-MMA-FMA-MMA-MMA-FMA-FMA-MMA-FMA-FMA-FMA)- where MMA represents methylmethacrylate and FMA represents a fluoroalkyl methacrylate.

The order in which monomer residues occur along the backbone of the copolymer typically is determined by the order in which the corresponding monomers are fed into the vessel in which the controlled radical polymerization is conducted. For example, the monomers that are incorporated as residues at the tail end of the copolymer are generally fed into the reaction vessel prior to those monomers that are incorporated at the head end.

During formation of the gradient polymer, if more than one monomer is fed into the reaction vessel at a time, the relative reactivities of the monomers typically determine the order in which they are incorporated into the living polymer chain.

One manner in which a gradient copolymer of the present invention can be prepared is to add the other polymerizable ethylenically unsaturated monomer(s) to a reaction vessel containing an ATRP initiator system as described above. The low surface tension (meth)acrylate monomer is then fed to the reaction vessel over a period of time. As the other polymerizable ethylenically unsaturated monomer(s) are consumed, the relative concentration of the low surface tension (meth)acrylate monomer will increase. The composition and architecture along the copolymer will reflect the changing relative concentrations of the monomers present over time, i.e., the head end will be rich in the other polymerizable ethylenically unsaturated monomer(s) and the tail end of the copolymer will be rich in the low surface tension (meth)acrylate monomer.

In another embodiment, the relative reactivities, or reactivity ratios, of the other polymerizable ethylenically unsaturated monomer(s) and the low surface tension (meth) acrylate monomer can be used to control the gradient copolymer composition. In this method, all of the monomers are added or fed over time to a reaction vessel containing an ATRP initiator system as described above. The copolymer architecture will be determined by relative monomer reactivities. The more reactive monomers will predominate initially and as the relative concentration of less reactive monomers increases with the depletion of the more reactive monomers, they will incorporate more readily into the living ATRP copolymer. The net effect of this approach is to create a tail end rich in reactive monomer(s) and a head end rich in less reactive monomer(s).

The copolymer typically has a number average molecular weight (Mn) of from 500 to 1,000,000, preferably from 1,000 to 100,000 and most preferably from 1,500 to 50,000, as determined by gel permeation chromatography using polystyrene standards. The polydispersity index, i.e., weight average molecular weight (Mw) divided by the number average molecular weight (Mn) of the copolymer typically are less than 2.5, preferably less than 2.0 and most preferably less than 1.5.

When the copolymer is a gradient copolymer made using controlled radical polymerization, a residue of the initiator used in the preparation of the gradient copolymer, free of the radically transferable group of the initiator, is part of the gradient copolymer as shown in structure XIX:

where φ, O, L and T are as described above, p and q represent average numbers of monomer residues occurring in a random copolymer as in formula XX or in a block of monomer residues in a block copolymer as in formula XXI. The number of block sequences in a block copolymer is defined by x. In general, p and q are integers representing the respective average number of monomer residues in a copolymer. The number of other monomers, p, can be from 1 to 1,000, preferably from 2 to 500 and most preferably from 3 to 250. The number of low surface tension (meth) acrylate monomers, L, can be from 1 to 200, preferably from 1 to 100 and most preferably from 1 to 50.

In a preferred embodiment, the controlled radical polymerization method is ATRP using an initiator with a radically transferable group. The radically transferable group is typically a halide group, preferably a bromide group. The halide residue may be (a) left on the copolymer, (b) removed or (c) chemically converted to another moiety. The radically transferable group may be removed by substitution with a nucleophilic compound, e.g., an alkali metal alkoxylate. Graft-group-terminal halogens can be removed from the copolymer by means of a mild dehalogenation reaction. The reaction is typically performed as a post-reaction after the graft (co)polymer has been formed, and in the presence of at least an ATRP catalyst. Preferably, the dehalogenation post-reaction is performed in the presence of both an ATRP catalyst and its associated ligand.

The copolymers of the present invention can be used as, without limitation, film-forming compositions, rheology modifiers, pigment or ink dispersants, gel matrices and molding resins. The fields of use of the copolymers are varied and include, without limitation, articles and industrial uses, such as in the automotive industry, medical uses, such as in the production of novel films and matrices for use in bioengineering and tissue engineering, pharmaceutical uses, such as in the production of drug delivery matrices and chemical industry uses, such as in the preparation of gels for product separation and purification, and in chemical and biological research, such as in tailored gel matrices for reagent purification.

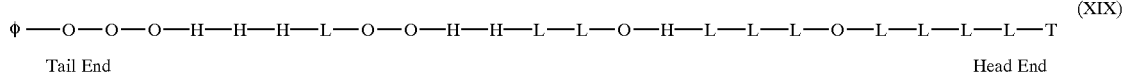

where φ represents the initiator residue, O represents the other polymerizable ethylenically unsaturated monomer, H represents a third monomer, L represents a low surface tension (meth)acrylate monomer and T represents the radically transferable group.

The copolymer made using ATRP may also have other architectures such as a block copolymer, represented by formula XX or a random copolymer, represented by formula XXI:

When the copolymer of the present invention is a gradient copolymer made using ATRP, it will contain a residue from the initiator, φ. Depending on the number of radically transferable groups on the initiator, the location of initiator residue φ will vary. When one radically transferable group is present in the initiator, structure XXII may result. When two radically transferable groups are present in the initiator, structure XXIII may result.

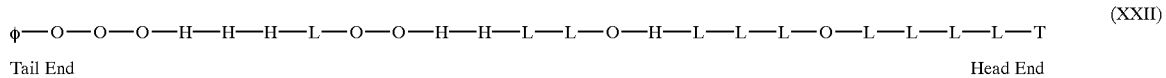

-continued

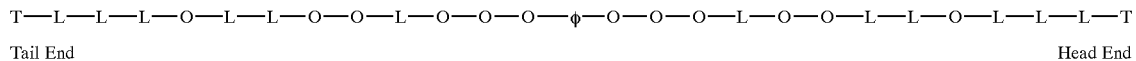

(XXIII)

Tail End                                                                                                                                           Head End in which O, L and H are as defined above, φ is or is derived from the residue of the initiator free of radically transferable groups and T is or is derived from the radically transferable group of the initiator.

When the copolymer of the present invention is a gradient copolymer, it may be additionally generally described by the following representative polymer chain structure XXIV:

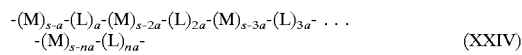

(XXIV)

where s is an integer from 1 to 300 and is constant or a given copolymer, a is an integer from 1 to 10 and is constant for a given copolymer, n is an integer from 1 to 299 such that the relationship s-na is greater than or equal to zero, M is an other radically polymerizable ethylenically unsaturated monomer and L is a radically polymerizable low surface tension (meth)acrylate monomer. M may represent a group of one or more radically polymerizable ethylenically unsaturated monomers.

When the gradient copolymer of the present invention is prepared by ATRP in the presence of an initiator having a radically transferable group, the gradient copolymer may be further described as having the following structure XXV:

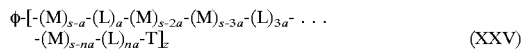

(XXV)

in which s is an integer from 1 to 300, preferably from 1 to 200, more preferably from 1 to 100 and most preferably from 1 to 50 and is constant for a given copolymer; a is an integer from 1 to 50, preferably from 1 to 40, more preferably from 1 to 25 and most preferably from 1 to 10 and is constant for a given copolymer; n is an integer from 1 to 299, preferably from 1 to 199, more preferably from 1 to 99, and most preferably from 1 to 49; such that the relationship s-na is greater than or equal to zero; M represents an other radically polymerizable ethylenically unsaturated monomer; L represents a radically polymerizable low surface tension (meth)acrylate monomer; 4 is or is derived from the residue of the initiator free of radically transferable groups; T is or is derived from the radically transferable group of the initiator; z is at least equal to the number of radically transferable groups of the initiator and is independently for each structure at least 1, for example from 1 to 100, preferably from 1 to 50, more preferably from 1 to 10 and most preferably from 1 to 5.

With reference to polymer chain structures XXIV and XXV, M may optionally include residues having a minor amount of at least one hydroxy functional ethylenically unsaturated radically polymerizable monomer, such as hydroxypropyl (meth)acrylate, in which s and p are each independently from 1 to 100 and q is independently from 0 to 100. The hydroxy functional ethylenically unsaturated radically polymerizable monomer is as described previously herein.

In a further embodiment of the gradient copolymer example, the gradient copolymer can be a gradient block copolymer, wherein it includes a gradient block and a block that includes the low surface tension (meth)acrylate monomer as described by general formula XXVI:

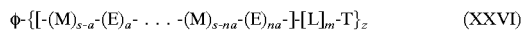

(XXVI)

where φ, M, L, T, s, n and z are as defined above; a is an integer from 1 to 200, preferably from 1 to 100, more preferably from 1 to 50 and most preferably from 1 to 25 and is constant for a given copolymer; E is a third polymerizable ethylenically unsaturated monomer and m is an integer from 1 to 50, preferably from 1 to 40, more preferably from 1 to 25 and most preferably from 1 to 10.

In a preferred embodiment, monomer composition E has a moderate surface tension effect. Any monomer that has mild surface tension altering properties can be used in monomer composition E. Preferred moderate surface tension monomers include, but are not limited to, branched alkyl (meth)acrylates such as 2-ethylhexyl (meth)acrylate, ethoxylated (meth)acrylates and propoxylated (meth)acrylates. In addition to the gradient copolymer including moderate surface tension monomer E described above, such monomers can be used in the present invention in random and block copolymers as described in formulas XXVII and XXVIII:

(XXVII)

(XXVIII)

where O, E, L, p, q and x are as previously defined and s is an integer describing the number residues of moderate surface tension monomer E in a random copolymer or in a block of residues in a block copolymer and can be from 1 to 1,000, preferably from 1 to 500 and most preferably from 1 to 100.

Symbol T of general formulas XIX, XX, XXI, XXII, XXIII, XXV and XXVI is or is derived from the radically transferable group of the initiator. For example, when the gradient copolymer is prepared in the presence of diethyl-2-bromo-2-methyl malonate, T may be the radically transferable bromo group.

The radically transferable group may optionally be (a) removed or (b) chemically converted to another moiety. In either of (a) or (b), the symbol T is considered herein to be derived from the radically transferable group of the initiator. The radically transferable group may be removed by substitution with a nucleophilic compound, such as an alkali metal alkoxylate. However, in the present invention, it is desirable that the method by which the radically transferable group is either removed or chemically converted also be relatively mild.

In an embodiment of the present invention, when the radically transferable group is a halogen, the halogen can be removed by means of a mild dehalogenation reaction. The reaction is typically performed as a post-reaction after the polymer has been formed, and in the presence of at least an ATRP catalyst. Preferably, the dehalogenation post-reaction is performed in the presence of both an ATRP catalyst and its associated ligand.

The mild dehalogenation reaction is performed by contacting the halogen terminated copolymer of the present invention with one or more ethylenically unsaturated compounds, which are not readily radically polymerizable under at least a portion of the spectrum of conditions under which ATRP polymerizations are performed, hereinafter referred to as "limited radically polymerizable ethylenically unsaturated monomers" (LRPEU compound). As used herein, by "halogen terminated" and similar terms is meant to be inclusive also of pendant halogens, such as those that would be present in branched, comb and star polymers.

Not intending to be bound by any theory, it is believed, based on the evidence at hand, that the reaction between the halogen terminated copolymer and one or more LRPEU compounds results in (1) removal of the terminal halogen group, and (2) the addition of at least one carbon-carbon double bond where the terminal carbon-halogen bond is broken.

The dehalogenation reaction is typically conducted at a temperature of from 0° C. to 200° C., preferably from 0° C. to 160° C. at a pressure in the range of 0.1 to 100 atmospheres, preferably from 0.1 to 50 atmospheres. The reaction is also typically performed in less than 24 hours, preferably between 1 and 8 hours. While the LRPEU compound may be added in less than a stoichiometric amount, it is preferably added in at least a stoichiometric amount relative to the number of moles of terminal halogen present in the copolymer. When added in excess of a stoichiometric amount, the LRPEU compound is typically present in an amount of no greater than 5 mole percent, preferably 1 to 3 mole percent in excess of the total moles of terminal halogen.

Limited radically polymerizable ethylenically unsaturated compounds useful for dehalogenating the copolymer of the composition of the present invention under mild conditions include those represented by the general formula XXIX:

(XXIX)

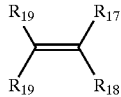

In general formula XXIX, $R_{17}$ and $R_{18}$ can be the same or different organic groups such as alkyl groups having from 1 to 4 carbon atoms; aryl groups; alkoxy groups; ester groups; alkyl sulfur groups; acyloxy groups; and nitrogen-containing alkyl groups where at least one of the $R_{17}$ and $R_{18}$ groups is an organo group while the other can be an organo group or hydrogen. For instance, when one of $R_{17}$ and $R_{18}$ is an alkyl group, the other can be an alkyl, aryl, acyloxy, alkoxy, arenes, sulfur-containing alkyl group, or nitrogen-containing alkyl and/or nitrogen-containing aryl groups. The $R_{19}$ groups can be the same or different groups selected from hydrogen or lower alkyl selected such that the reaction between the terminal halogen or the copolymer and the LRPEU compound is not prevented. Also an $R_{19}$ group can be joined to the $R_{17}$ and/or the $R_{18}$ groups to form a cyclic compound.

It is preferred that the LPREU compound be free of halogen groups. Examples of suitable LRPEU compounds include, but are not limited to, 1,1-dimethylethylene, 1,1-diphenylethylene, isopropenyl acetate, alpha-methyl styrene, 1,1-dialkoxy olefin and mixtures thereof. Additional examples include dimethyl itaconate and diisobutene (2,4,4-trimethyl-1-pentene).

For purposes of illustration, the reaction between halogen terminated copolymer and LRPEU compound, such as alpha-methyl styrene, is summarized in the following general scheme 1.

General Scheme 1

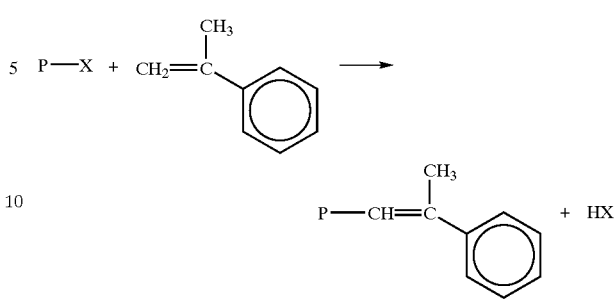

In general scheme 1, P—X represents the halogen terminated copolymer.

The copolymers of the present invention are unique in that they contain the low surface tension (meth)acrylate monomer. This property can be very useful, for example, when the present copolymers are used in coating applications. Not wishing to be bound to a single theory, it is believed that the surface tension reducing effect of the fluoroalkyl (meth)acrylate blocks of the copolymer of the present invention provide superior flow control properties, crater prevention and coating physical properties to all types of coating compositions. In the case of a gradient copolymer, it is believed that the head end of the gradient copolymer, which contains a proportionally higher content of the low surface tension (meth)acrylate monomers orient at the coating/air interface, effectively reducing the surface tension of the coating, thus minimizing surface defects such as waviness and cratering. The tail end of the gradient copolymer which is predominantly low surface tension (meth)acrylate monomer deficient extends into the coating adding strength to the coating and improving adhesion to the coated substrate. The orientation of the low surface tension (meth)acrylate rich head end of the gradient copolymer as described above is not possible with random copolymers. In a random copolymer, if the fluoroalkyl (meth)acrylate monomer is present at high enough concentration, the entire polymer will orient at the coating/air interface. At lower fluoroalkyl (meth)acrylate monomer concentration, the random copolymer will simply remain in the coating. Therefore, the dual properties of coating property improvement and improved adhesion to the substrate cannot be realized with a random copolymer containing fluoroalkyl (meth)acrylate monomer.

Referring to formulas IV and V, when the divalent linking group Y of formula IV is of sufficient length or the —(CH$_2$)$_m$— group of formula V is of sufficient length, the copolymer may take on a quasi-comb polymer architecture. In this situation, the low surface tension functional group (fluorine or siloxane containing group for example) may be sufficiently extended from the backbone of the polymer to independently orient at the coating/air interface, regardless of its position along the polymer chain, effectively reducing the surface tension of the coating and minimizing surface defects such as waviness and cratering. In the quasi-comb copolymer situation, the distance of extension of the surface tension lowering group away from the polymer backbone may override polymer architecture considerations and most copolymer architectures (random, block, gradient, etc.) may be effective at coating property improvement and improved coating adhesion to a substrate.

In the gradient copolymer situation, the gradient copolymer may be superior to similarly constructed block copolymers, as the gradient approach provides a gradual rather than an abrupt copolymer architecture and composition change. The gradual composition and architecture change in the gradient copolymer minimizes problems such as phase separation and copolymer incompatibility.

In an embodiment of the present invention, the copolymer of the present invention may be used as a flow control agent in a thermosetting composition. The thermosetting composition of the present invention further comprises a non-gelled polymer with functional groups and a crosslinking agent having at least two functional groups that are reactive with the functional groups of the polymer.

Not wishing to be limited to any one set of functional groups, there are several examples of co-reactive functional groups that can be used in the present invention. The functional groups of the polymer can be, but are not limited to epoxy or oxirane; carboxylic acid; hydroxy; amide; oxazoline; aceto acetate; isocyanate; or carbamate. The crosslinking agent has at least two functional groups that are different than those contained in the polymer and is co-reactive toward the functional groups of the polymer and can be, but is not limited to epoxy or oxirane; carboxylic acid; hydroxy; polyol; isocyanate; capped isocyanate; amine; aminoplast and beta-hydroxyalkylamide.

When the polymer has hydroxyl functionality, examples of suitable crosslinking agents include aminoplasts containing methylol and/or methylol ether groups and polyisocyanates.

Aminoplasts are obtained from the reaction of formaldehyde with an amine or amide. The most common amines or amides are melamine, urea, or benzoguanamine, and are preferred. However, condensates with other amines or amides can be used; for example, aldehyde condensates of glycoluril, which give a high melting crystalline product which is useful in powder coatings. While the aldehyde used is most often formaldehyde, other aldehydes such as acetaldehyde, crotonaldehyde, and benzaldehyde may be used.

The aminoplast contains methylol groups and, preferably, at least a portion of these groups are etherified with an alcohol to modify the cure response. Any monohydric alcohol may be employed for this purpose including methanol, ethanol, butanol, isobutanol, and hexanol.

Preferably, the aminoplasts which are used are melamine-, urea-, or benzoguanamine-formaldehyde condensates etherified with an alcohol containing from one to four carbon atoms.

Other suitable crosslinking agents for hydroxy functional polymers include polyisocyanates. The polyisocyanate crosslinking agent may be a fully capped polyisocyanate with substantially no free isocyanate groups, or it may contain free isocyanate functionality. Free isocyanate groups allow for curing of the composition at temperatures as low as ambient. When the crosslinking agent contains free isocyanate groups, the film-forming composition is preferably a two-package composition (one package comprising the crosslinking agent and the other comprising the hydroxyl functional polymer) in order to maintain storage stability.

The polyisocyanate can be an aliphatic or an aromatic polyisocyanate or a mixture of the two. Diisocyanates are preferred, although higher polyisocyanates can be used in place of or in combination with diisocyanates.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. Examples of suitable higher polyisocyanates are triphenylmethane-4,4',4"-triisocyanate, 1,2,4-benzene triisocyanate and polymethylene polyphenyl isocyanate. Biurets and isocyanurates of diisocyanates, including mixtures thereof, such as the isocyanurate of hexamethylene diisocyanate, the biuret of hexamethylene diisocyanate and the isocyanurate of isophorone diisocyanate are also suitable.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used.

Any suitable aliphatic, cycloaliphatic, or aromatic alkyl monoalcohol or phenolic compound may be used as a capping agent for the capped polyisocyanate crosslinking agent in the composition of the present invention including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether.

Other suitable capping agents include oximes such as methyl ethyl ketoxime, acetone oxime and cyclohexanone oxime, lactams such as epsilon-caprolactam, and amines such as dibutyl amine.

When the functionality of the polymer is an oxirane or epoxy group, the crosslinking agent has at least two functional groups that are reactive with epoxides. The at least two functional groups are intended to include mixtures of functional groups. The functional groups that are reactive with epoxides include, but are not limited to, polyamines, polyamides, polycarboxylic acids, polyanhydrides, aminoplasts, and polyphenolic compounds.

Suitable polyamines include, but are not limited to, amine and amide functional addition polymers and oligomers typically used in film-forming compositions such as acrylic and vinyl polymers.

Suitable polycarboxylic acids include, but are not limited to dodecanedioic acid, azelaic acid, adipic acid, 1,6-hexanedioic acid, succinic acid, sebacic acid, maleic acid, citric acid, itaconic acid, pimelic acid, aconitic acid, carboxylic acid terminated polyesters, half-esters formed from reacting an anhydride with a polyol, carboxylic acid containing polymers such as acrylic acid and methacrylic acid containing polymers, polyesters and polyurethanes, fatty diacids and mixtures thereof.

Suitable polyanhydrides include addition polymers and oligomers typically used in film-forming compositions such as acrylic and vinyl polymers. Examples include, but are not limited to those described in U.S. Pat. Nos. 4,798,746 and 4,732,790.

When the polymer has carboxylic acid functionality, the crosslinking agent is a beta-hydroxyalkylamide, as described above.

The crosslinking agent is typically present in the thermosetting compositions of the present invention in an amount of at least 10 percent by weight, preferably at least 25 percent by weight, based on the total resin solids weight of the composition. The crosslinking agent is also typically present in the composition in an amount of less than 90 percent by weight, preferably less than 75 percent by weight, based on the total resin solids weight of the composition. The amount of crosslinking agent present in the thermosetting composition of the present invention may range between any combination of these values, inclusive of the recited values.

The equivalent ratio of functional groups in the polymer to reactive functional groups in the crosslinking agent is typically within the range of 1:0.5 to 1:1.5, preferably 1:0.8 to 1:1.2.

Usually, the thermosetting composition will also preferably contain catalysts to accelerate the cure of the crosslinking agent with reactive groups on the polymer(s).

Suitable catalysts for aminoplast cure include acids such as acid phosphates and sulfonic acid or a substituted sulfonic acid. Examples include dodecylbenzene sulfonic acid, para-toluene sulfonic acid, phenyl acid phosphate, ethylhexyl acid phosphate, and the like. Suitable catalysts for isocyanate cure include organotin compounds such as dibutyltin oxide, dioctyltin oxide, dibutyltin dilaurate, and the like. The catalyst is usually present in an amount of about 0.05 to about 5.0 percent by weight, preferably about 0.25 to about 2.0 percent by weight, based on the total weight of resin solids in the thermosetting composition.

The thermosetting composition of the present invention is preferably used as a film-forming (coating) composition, and may contain adjunct ingredients conventionally used in such compositions. Optional ingredients such as, for example, plasticizers, surfactants, thixotropic agents, anti-gassing agents, organic cosolvents, flow controllers, antioxidants, UV light absorbers and similar additives conventional in the art may be included in the composition. These ingredients are typically present at up to about 40% by weight based on the total weight of resin solids.

The thermosetting composition of the present invention is typically a liquid and may be waterborne, but is usually solventborne. Suitable solvent carriers include the various esters, ethers, and aromatic solvents, including mixtures thereof, that are known in the art of coating formulation. The composition typically has a total solids content of about 40 to about 80 percent by weight.

The thermosetting composition of the present invention may contain color pigments conventionally used in surface coatings and may be used as a monocoat; that is, a pigmented coating. Suitable color pigments include, for example, inorganic pigments such as titanium dioxide, iron oxides, chromium oxide, lead chromate, and carbon black, and organic pigments such as phthalocyanine blue and phthalocyanine green. Mixtures of the above-mentioned pigments may also be used. Suitable metallic pigments include, in particular, aluminum flake, copper bronze flake and metal oxide coated mica, nickel flakes, tin flakes, and mixtures thereof.

In general, the pigment is incorporated into the coating composition in amounts up to about 80 percent by weight, based on the total weight of coating solids. The metallic pigment is employed in amounts of about 0.5 to about 25 percent by weight based on the total weight of coating solids.

As stated above, the thermosetting compositions of the present invention may be used in a method of coating a substrate comprising applying a thermosetting composition to the substrate, coalescing the thermosetting composition over the substrate in the form of a substantially continuous film, and curing the thermosetting composition.

The compositions can be applied to various substrates to which they adhere including wood, metals, glass, and plastic. The compositions can be applied by conventional means including brushing, dipping, flow coating, spraying and the like, but they are most often applied by spraying. The usual spray techniques and equipment for air spraying and electrostatic spraying and either manual or automatic methods can be used.

After application of the composition to the substrate, the composition is allowed to coalesce to form a substantially continuous film on the substrate. Typically, the film thickness will be about 0.01 to about 5 mils (about 0.254 to about 127 microns), preferably about 0.1 to about 2 mils (about 2.54 to about 50.8 microns) in thickness. The film is formed on the surface of the substrate by driving solvent, i. e., organic solvent and/or water, out of the film by heating or by an air drying period. Preferably, the heating will only be for a short period of time, sufficient to ensure that any subsequently applied coatings can be applied to the film without dissolving the composition. Suitable drying conditions will depend on the particular composition, but, in general, a drying time of from about 1 to 5 minutes at a temperature of about 68–250° F. (20–121° C.) will be adequate. More than one coat of the composition may be applied to develop the optimum appearance. Between coats the previously applied coat may be flashed; that is, exposed to ambient conditions for about 1 to 20 minutes.

The film-forming composition of the present invention is preferably used as the clear coat layer in a multi-component composite coating composition such as a "color-plus-clear" coating system, which includes at least one pigmented or colored base coat and at least one clear topcoat. In this embodiment, the clear film-forming composition may include the thermosetting composition of the present invention.

The film-forming composition of the base coat in the color-plus-clear system can be any of the compositions useful in coatings applications, particularly automotive applications. The film-forming composition of the base coat comprises a resinous binder and a pigment to act as the colorant. Particularly useful resinous binders are acrylic polymers, polyesters, including alkyds, and polyurethanes. Polymers prepared using atom transfer radical polymerization may also be used as resinous binders in the base coat.

The base coat compositions may be solventborne or waterborne. Waterborne base coats in color-plus-clear compositions are disclosed in U.S. Pat. No. 4,403,003, and the resinous compositions used in preparing these base coats can be used in the practice of this invention. Also, waterborne polyurethanes such as those prepared in accordance with U.S. Pat. No. 4,147,679 can be used as the resinous binder in the base coat. Further, waterborne coatings such as those described in U.S. Pat. No. 5,071,904 can be used as the base coat.

The base coat contains pigments to give it color. Suitable pigments include those discussed above. In general, the pigment is incorporated into the coating composition in amounts of about 1 to 80 percent by weight based on weight of coating solids. Metallic pigment is employed in amounts of about 0.5 to 25 percent by weight based on weight of coating solids.

If desired, the base coat composition may contain additional materials well known in the art of formulated surface coatings, including those discussed above. These materials can constitute up to 40 percent by weight of the total weight of the coating composition.

The base coating compositions can be applied to various substrates to which they adhere by conventional means, but they are most often applied by spraying. The usual spray techniques and equipment for air spraying and electrostatic spraying and either manual or automatic methods can be used.

During application of the base coat composition to the substrate, a film of the base coat is formed on the substrate. Typically, the base coat thickness will be about 0.01 to 5 mils (0.254 to 127 microns), preferably 0.1 to 2 mils (2.54 to 50.8 microns) in thickness.

After application of the base coat to the substrate, a film is formed on the surface of the substrate by driving solvent out of the base coat film by heating or by an air drying period, sufficient to ensure that the clear coat can be applied to the base coat without the former dissolving the base coat composition, yet insufficient to fully cure the base coat. More than one base coat and multiple clear coats may be applied to develop the optimum appearance. Usually between coats, the previously applied coat is flashed.

The clear topcoat composition may be applied to the base coated substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

After application of the clear coat composition to the base coat, the coated substrate may be heated to cure the coating layer(s). In the curing operation, solvents are driven off and the film-forming materials in the composition are crosslinked. The heating or curing operation is usually carried out at a temperature in the range of from at least ambient (in the case of free polyisocyanate crosslinking agents) to 350° F. (ambient to 177° C.) but, if needed, lower or higher temperatures may be used as necessary to activate crosslinking mechanisms.

EXAMPLES

Example 1
Synthesis of Gradient Copolymer MMA-gradient-2-EHMA-b-Zonyl™

The gradient copolymer MMA-gradient-EHMA-b-Zonyl™ was prepared by polymerization the ingredients in Table 1 in Aromatic 100 solvent:

TABLE 1

| | Ingredients | Parts by weight (grams) |
|---|---|---|
| Charge 1 | Aromatic 100 | 300 |
| | Copper | 0.89 |
| | Tris (2-aminoethyl) amine/6BA | 8.96 |
| | Ethyl-2-bromoisobutyrate | 27.30 |
| | MMA | 196 |
| Charge 2 | 2-EHMA | 777.38 |
| | Aromatic 100 | 100 |
| Charge 3 | Aromatic 100 | 60.90 |
| | ZONYL TM fluoromonomer 2-(perfluoroalkyl) ethyl methacrylate (DuPont) | 74.76 |

Charge 1 was heated in a reaction vessel with agitation at 80° C. and the reaction mixture was held at this temperature for 1.5 hours. After partial homopolymerization of MMA, charge 2 was continuously added to the reaction vessel for 3 hrs to form a compositional gradient along the polymer chain. The compositional gradient was controlled through the use of controlled 2-EHMA addition based on its reactivity ratio found in the literature ($r_1$ MMA=0.86, $r_2$ EHMA= 0.69: Journal of Thermal Analysis, Vol. 36, pp. 617–628 (1990)). The reaction mixture was held at 80° C. for 3 hours. Charge 3 was added over a period of 15 minutes and the reaction mixture was held at 80° C. for 3 hours. The reaction mixture was cooled and filtered.

The resultant gradient copolymer had a total solid content of 70 percent determined at 110° C. for one hour. The copolymer had a number average molecular weight, Mn=8040 and polydispersity, Mw/Mn=1.32 (determined by gel permeation chromatography using polystyrene standards), with a theoretical Mn=7680.

Example 2
Resistance of Paint to Contamination

A commercial, solvent-borne, thermosetting clear coat, DCT5555 (available from PPG Industries, Inc., Pittsburgh, Pa.) was deliberately contaminated with a commercial caustic wash solution typically used in cleaning transport containers for coatings and known to induce cratering. The polymer of example 1 was added to a portion of this clearcoat at a level of 0.1% by weight and thoroughly mixed by stirring.

The clear coat treated (with the polymer of example 1) and an untreated clear coat were applied to sixteen 12"×18" commercially available electrocoated steel panels using an ESTA bell. The clear coat was applied in two coats with a 90 second flash between coats, flashed for 10 minutes at ambient conditions, and then baked for 10 minutes at 345° F. The final film thicknesses were 1.8 to 2.0 mils. The total number of craters in the untreated, cured panels was 33. The total number of craters on the treated, cured panels was 22. Appearance of the two films was equivalent.

Example 3
Resistance to Surface Contamination

A commercial, solvent-borne, thermoset clearcoat (FDCT 8000, available from PPG Industries, Inc.) was treated, as described in example 2, at 0.05% and 0.1% with the polymer of example 1.

Commercially available electrocoated 4"×12" steel panels were spot contaminated with 0.1 to 0.2 microgram quantities of a series of polymers with varying surface tension. The two treated and one untreated clear coats were spray applied onto identically spot contaminated test panels. The clearcoat was applied in two coats with a sixty second flash in between coats, flashed for 10 minutes at ambient conditions and baked for 30 minutes at 285° F. Dry film thicknesses were 1.6–1.8 mils.

The ability of each clear coat to cover each of the contaminant polymers without leaving a visible defect has been correlated to its crater resistance. Each contaminant spot was rated against a set of arbitrarily defined standards. Typical ratings for each clear coat, with 80 as a perfect score, are as follows:

| | Rating |
|---|---|
| FDCT 8000 untreated | 51 |
| FDCT 8000 + 0.05% additive | 59 |
| FDCT 8000 + 0.1% additive | 61 |

Recoat adhesion and appearance were about equal for the treated and untreated clear coats.

The present invention has been described with reference to specific details of particular embodiments thereof. It is not intended that such details be regarded as limitations upon the scope of the invention except insofar as and to the extent that they are included in the accompanying claims.

We claim:

1. A gradient copolymer comprising radically polymerizable low surface tension (meth)acrylate monomers and at least one other radically polymerizable ethylenically unsaturated monomer, wherein the radically polymerizable low surface tension (meth)acrylate monomers are selected from at least one low surface tension (meth)acrylate monomer represented by the general formulas:

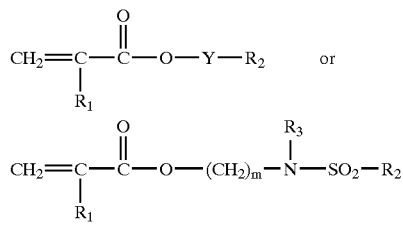

wherein $R_1$ is selected independently for each general formula from hydrogen, methyl and ethyl, $R_2$ is selected independently or each general formula from the group consisting of linear, branched, cyclic, aryl and arylalkyl fluorinated hydrocarbon groups containing from 4–20 carbon, a siloxane, a polysiloxane, an alkyl siloxane, an ethoxylated trimethylsilyl siloxane and a propoxylated trimethylsilyl siloxane; Y is a divalent linking group containing from 1 to 20 carbon atoms, m is an integer from 1 to 4, and $R_3$ is a $C_1$–$C_4$ alkyl group, and wherein the copolymer has a polydispersity of less than 2.5, has a head end and a tail end, residues of the low surface tension (meth)acrylate monomers are positioned at the head end, residues of the at least one other radically polymerizable ethylenically unsaturated monomer are positioned at the tail end, and the proportion of low surface tension monomer residues to other monomer residues changes along the copolymer such that the concentration of low surface tension monomer residues decreases and the concentration of other monomer residues increases moving from the head end to the tail end of the copolymer.

2. The copolymer of claim 1 further comprising a third monomer, wherein the concentration of the third monomer increases moving from the head end to the tail end of the copolymer.

3. The copolymer of claim 1 wherein the at least one other radically polymerizable ethylenically unsaturated monomer is free of hydroxyl groups and amine groups.

4. The copolymer of claim 1 wherein m is 2.

5. The copolymer of claim 1 wherein the structure of group $R_2$ is selected from the group consisting of:

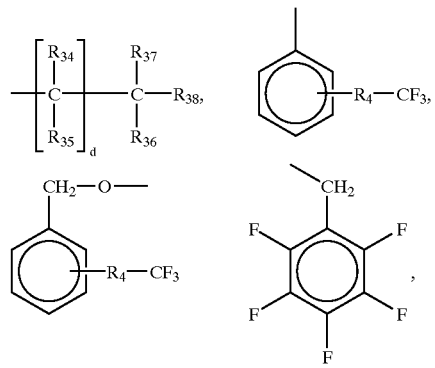

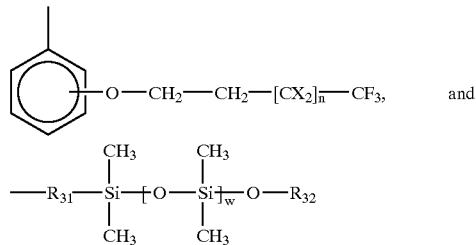

wherein $R_{34}$, $R_{35}$, $R_{36}$, $R_{37}$ and $R_{38}$ are independently selected from the group consisting of H, F and $C_1$ to $C_6$ alkyl; such that at least one occurrence of $R_{34}$, $R_{35}$, $R_{36}$, $R_{37}$ or $R_{38}$ is F; d is an integer from 3 to 19; $R_4$ is selected from the group consisting of $C_1$–$C_4$ alkyl and $C_1$–$C_4$ alkynol; x is selected from the group consisting of H and F; n is an integer from 1 to 10; $R_{31}$ is selected from the group consisting of linear, branched and cyclic $C_2$–$C_{18}$ alkyl and a polyether as described by:

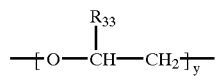

wherein $R_{33}$ is selected from the group consisting of hydrogen, halide and methyl; y is an integer from 1 to 100; $R_{32}$ is selected from the group consisting of H, linear, branched and cyclic $C_1$–$C_{18}$ alkyl and a trimethylsiloxane as described by:

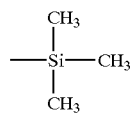

and w is an integer from 0 to 500.

6. The copolymer of claim 1 comprising residues of a hydroxy functional radically polymerizable ethylenically unsaturated monomer, wherein the concentration of hydroxy functional monomer increases moving from the head end to the tail end of the copolymer.

7. The copolymer of claim 1 wherein said copolymer is prepared by controlled radical polymerization.

8. The copolymer of claim 7 wherein said copolymer is prepared by atom transfer radical polymerization initiated in the presence of an initiator having at least one radically transferable group.

9. The copolymer of claim 8 wherein said copolymer contains a residue of said initiator free of said radically transferable group, and a residue of or derived from said radically transferable group, said initiator being selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds and mixtures thereof, each having at least one radically transferable halide.

10. The copolymer of claim 9 wherein said initiator is selected from the group consisting of halomethane, methylenedihalide, haloform, carbon tetrahalide, 1-halo-2,3-epoxypropane, methanesulfonyl halide, p-toluenesulfonyl halide, methanesulfenyl halide, p-toluenesulfenyl halide, 1-phenylethyl halide, $C_1$–$C_6$-alkyl ester of 2-halo-$C_1$–$C_6$-carboxylic acid, p-halomethylstyrene, mono-hexakis (α-halo-C$_1$–C$_6$-alkyl)benzene, diethyl-2-halo-2-methyl malonate and mixtures thereof.

11. The copolymer of claim 1 wherein said copolymer is selected from the group consisting of linear copolymers, branched copolymers, hyperbranched copolymers, star copolymers, graft copolymers and mixtures thereof.

12. The copolymer of claim 1 wherein the radically polymerizable low surface tension (meth)acrylate monomers are present in an amount of from 0.01 percent by weight to 5 percent by weight, based on the total weight of said copolymer; and the at least one other radically polymerizable ethylenically unsaturated monomer is present in an amount of from 95 percent by weight to 99.99 percent by weight, based on the total weight of said copolymer.

13. The copolymer of claim 2 the radically polymerizable low surface tension (meth)acrylate monomers are present in an amount of from 0.01 percent by weight to 5 percent by weight, based on the total weight of said copolymer; the at least one other radically polymerizable ethylenically unsaturated monomer is present in an amount of from 25 percent by weight to 75 percent by weight, based on the total weight of said copolymer; and the third monomer is present in an amount of from 20 percent by weight to 74.99 percent by weight, based on the total weight of said copolymer.

14. The copolymer of claim 6 wherein said hydroxy functional monomer is present in an amount of from 0.01 percent by weight to 3 percent by weight, based on the total weight of said copolymer.

15. The copolymer of claim 2 wherein each of the at least one other radically polymerizable ethylenically unsaturated monomer and the third monomer are comprised of monomers independently selected from vinyl monomers, allylic monomers olefins and mixtures thereof.

16. The copolymer of claim 15 wherein the at least one other radically polymerizable ethylenically unsaturated monomer is one or more selected from the group consisting of isobornyl (meth)acrylate, n-butyl methacrylate, iso-butyl methacrylate, ethyl methacrylate, iso-decyl (meth)acrylate, lauryl (meth)acrylate, n-octyl (meth)acrylate, 2-ethylhexyl (meth)acrylate, n-butyl acrylate, iso-butyl acrylate, ethyl acrylate and mixtures thereof.

17. The copolymer of claim 15 wherein the third monomer is selected from the group consisting of isobornyl (meth)acrylate, n-butyl methacrylate, iso-butyl methacrylate, ethyl methacrylate and mixtures thereof; and said third monomer is selected from iso-decyl (meth)acrylate, lauryl (meth)acrylate, n-octyl (meth)acrylate, 2-ethylhexyl (meth)acrylate, n-butyl acrylate, iso-butyl acrylate, ethyl acrylate and mixtures thereof.

18. The copolymer of claim 6 wherein said hydroxyl functional monomer is selected from the group consisting of: hydroxyalkyl (meth)acrylates having from 2 to 20 carbon atoms in the alkyl group; epoxide functional ethylenically unsaturated radically polymerizable monomers, which are hydrolyzed; hydroxyalkyl (meth)acrylates having from 2 to 20 carbon atoms in the alkyl group, which are reacted with a lactone; beta-hydroxy ester functional (meth)acrylates, which are the reaction product of (i) (meth) acrylic acid and a glycidyl ester of a saturated monocarboxylic acid having from 4 to 26 carbon atoms, or (ii) glycidyl (meth)acrylate and a saturated monocarboxylic acid having from 4 to 26 carbon atoms; and mixtures thereof.

19. The copolymer of claim 18 wherein said hydroxyalkyl (meth)acrylate is selected from hydroxyethyl (meth) acrylate, hydroxypropyl (meth) acrylate, hydroxybutyl (meth)acrylate and mixtures thereof; said epoxide functional monomer is selected from the group consisting of glycidyl (meth)acrylate, 3,4-epoxycyclohexylmethyl (meth)acrylate, 2-(3,4-epoxycyclohexyl)ethyl (meth)acrylate, allyl glycidyl ether and combinations thereof; said lactone is selected from the group consisting of β-propiolactone, β-butyrolactone, γ-butyrolactone, α-methyl-γ-butyrolactone, δ-valerolactone, γ-lactone, γ-caprolactone, ε-caprolactone and mixtures thereof; and said beta-hydroxy ester functional (meth) acrylate is the reaction product of glycidyl (meth)acrylate and isostearic acid.

20. The copolymer of claim 1 wherein said copolymer has a number average molecular weight of from 500 to 100,000.

21. The copolymer of claim 1 wherein $R_1$ is hydrogen or methyl, Y is —(CH$_2$)$_n$—, n being an integer from 1 to 11.

22. The copolymer of claim 8 wherein the gradient copolymer structure follows the formula:

wherein s is an integer from 1 to 300 and is constant for a given copolymer, a is an integer from 1 to 10 and is constant for a given copolymer, n is an integer from 1 to 299 such that s, n and a satisfy the relationship s-na>0 for each value of n, M represents the other radically polymerizable ethylenically unsaturated monomers, L represents the radically polymerizable low surface tension (meth)acrylate monomer, φ is or is derived from the residue of the initiator free of radically transferable groups; T is or is derived from the radically transferable group of the initiator; and z is at least 1.

23. The copolymer of claim 2 wherein the gradient copolymer structure follows the formula:

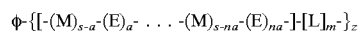

wherein s is an integer from 1 to 300 and is constant for a given copolymer; a is an integer from 1 to 200 and is constant for a given copolymer; n is an integer from 1 to 299 such that s, n and a satisfy the relationship s-na>0 for each value of n; M represents the other radically polymerizable ethylenically unsaturated monomers; L represents the radically polymerizable low surface tension (meth)acrylate monomer; φ is or is derived from the residue of the initiator free of radically transferable groups; T is or is derived from the radically transferable group of the initiator; and z is at least 1; E is a third polymerizable ethylenically unsaturated monomer; and m is an integer from 1 to 50.

24. The copolymer of claim 23 wherein E is 2-ethylhexyl methacrylate.

25. A method of making a low surface tension containing gradient copolymer using atom transfer radical polymerization (ATRP) comprising the step of adding a radically polymerizable low surface tension (meth)acrylate monomer and one or more other radically polymerizable ethylenically unsaturated monomers to a solution containing a suitable ATRP initiator to form a living radical copolymer, wherein the radically polymerizable low surface tension (meth) acrylate monomers are selected from at least one low surface tension (meth)acrylate monomer represented by the general formulas:

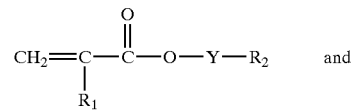

-continued

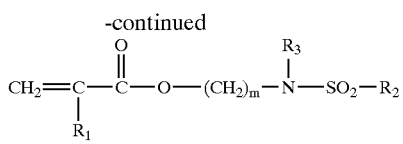

wherein $R_1$ is selected independently for each general formula from hydrogen, methyl and ethyl, $R_2$ is selected independently or each general formula from the group consisting of linear, branched, cyclic, aryl and arylalkyl fluorinated hydrocarbon groups containing from 4–20 carbon, a siloxane, a polysiloxane, an alkyl siloxane, an ethoxylated trimethylsilyl siloxane and a propoxylated trimethylsilyl siloxane; Y is a divalent linking group containing from 1 to 20 carbon atoms, m is an integer from 1 to 4, and $R_3$ is a $C_1$–$C_4$ alkyl group, and wherein the copolymer has a polydispersity of less than 2.5, has a head end and a tail end, residues of the low surface tension (meth)acrylate monomers are positioned at the head end, residues of the at least one other radically polymerizable ethylenically unsaturated monomer are positioned at the tail end, and the proportion of low surface tension monomer residue to other monomer residues changes along the copolymer such that the concentration of low surface tension monomer residues decreases and the concentration of other monomer residues increases moving from the head end to the tail end of the copolymer.

26. The method of claim 25 further comprising the step of adding a third monomer to said living copolymer, wherein said third monomer is different than said low surface tension (meth)acrylate monomer and said other radically polymerizable ethylenically unsaturated monomers, wherein the concentration of the third monomer increases moving from the head end to the tail end of the copolymer.

27. The method of claim 25 wherein m is 2.

28. The method of claim 25 wherein the structure of group $R_2$ is selected from the group consisting of:

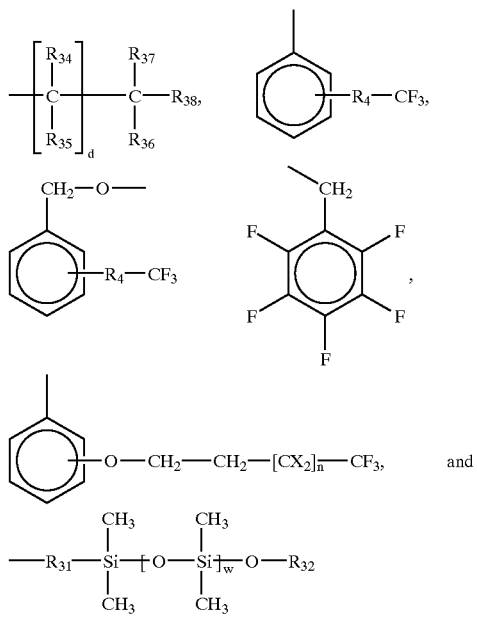

wherein $R_{34}$, $R_{35}$, $R_{36}$, $R_{37}$ and $R_{38}$ are independently selected from the group consisting of H, F and $C_1$ to $C_6$ alkyl; such that at least one occurrence of $R_{34}$, $R_{35}$, $R_{36}$, $R_{37}$ or $R_{38}$ is F; d is an integer from 3 to 19; $R_4$ is selected from the group consisting of $C_1$–$C_4$ alkyl and $C_1$–$C_4$ alkynol; X $R_4$ is selected from the group consisting of H and F; n is an integer from 1 to 10; $R_{31}$ is selected from the group consisting of linear, branched and cyclic $C_2$–$C_{18}$ alkyl an a polyether as described by:

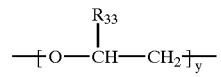

wherein $R_{33}$ is selected from the group consisting of hydrogen, halide and methyl; y is an integer from 1 to 100; $R_{32}$ is selected from the group consisting of H, linear, branched and cyclic $C_2$–$C_{18}$ alkyl and a trimethylsiloxane as described by:

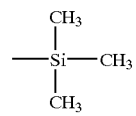

and w is an integer from 0 to 500.

29. The method of claim 25 wherein the radically polymerizable ethylenically unsaturated monomers comprise an hydroxy functional radically polymerizable ethylenically unsaturated monomer, wherein the concentration of hydroxy functional monomer increases moving from the head end to the tail end of the copolymer.

30. The method of claim 25 wherein said suitable ATRP initiator is selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds and mixtures thereof, each having at least one radically transferable halide.

31. The method of claim 30 wherein said suitable ATRP initiator is selected from the group consisting of halomethanes, methylenedihalides, haloforms, carbon tetrahalides, 1-halo-2,3-epoxypropanes, methanesulfonyl halides, p-toluenesulfonyl halides, methanesulfenyl halides, p-toluensulfenyl halide 1-phenylethyl halides, $C_1$–$C_6$-alkyl ester of 2-halo-$C_1$–$C_6$-carboxylic acids, p-halomethylstyrenes, mono-hexakis ($\alpha$-halo-$C_1$–$C_6$-alkyl) benzenes, diethyl-2-halo-2-methyl malonates and mixtures thereof.

32. The method of claim 25 wherein said copolymer is selected from the group consisting of linear copolymers, branched copolymers, hyperbranched copolymers, star copolymers, graft copolymers and mixtures thereof.

33. The method of claim 25 wherein said radically polymerizable low surface tension (meth)acrylate monomers are present in an amount of from 0.01 percent by weight to 5 percent by weight, based on the total weight of said low surface tension containing copolymer; and said at least one other radically polymerizable ethylenically unsaturated monomer is present in an amount of from 95 percent by weight to 99.99 percent by weight, based on the total weight of said low surface tension containing copolymer.

34. The method of claim 25 wherein said radically polymerizable low surface tension (meth)acrylate monomers are present in an amount of from 0.01 percent by weight to 5 percent by weight, based on the total weight of said low surface tension containing copolymer; said at least one other radically polymerizable ethylenically unsaturated monomer is present in an amount of from 25 percent by weight to 75 percent by weight, based on the total weight of said low surface tension containing copolymer; and said third monomer is present in an amount of from 20 percent by weight to 24.99 percent by weight, based on the total weight of said low surface tension containing copolymer.

35. The method of claim 29 wherein said hydroxy functional monomer is present in an amount of from 0.01 percent by weight to 3 percent by weight, based on the total weight of said block.

36. The method of claim 25 wherein each of said at least one other radically polymerizable ethylenically unsaturated monomer and said third monomer are comprised of monomers independently selected from vinyl monomers, allylic monomers, olefins and mixtures thereof.

37. The method of claim 25 wherein said at least one other radically polymerizable ethylenically unsaturated monomer is selected from the group consisting of isobornyl (meth) acrylate, n-butyl methacrylate, iso-butyl methacrylate, ethyl methacrylate, iso-decyl (meth)acrylate, lauryl (meth) acrylate, n-octyl (meth)acrylate, 2-ethylhexyl (meth) acrylate, n-butyl acrylate, iso-butyl acrylate, ethyl acrylate and mixtures thereof.

38. The method of claim 25 wherein said other radically polymerizable ethylenically unsaturated monomers are selected from the group consisting of isobornyl (meth) acrylate, n-butyl methacrylate, iso-butyl methacrylate, ethyl methacrylate.

39. The method of claim 25 wherein said hydroxy functional monomer is selected from the group consisting of: hydroxyalkyl (meth)acrylates having from 2 to 20 carbon atoms in the alkyl group; epoxide functional ethylenically unsaturated radically polymerizable monomers, which are hydrolyzed; hydroxyalkyl (meth)acrylates having from 2 to 20 carbon atoms in the alkyl group, which are reacted with a lactone; beta-hydroxy ester functional (meth)acrylates, which are the reaction product of (i) (meth)acrylic acid and a glycidyl ester of a saturated monocarboxylic acid having from 4 to 26 carbon atoms, or (ii) glycidyl (meth)acrylate and a saturated monocarboxylic acid having from 4 to 26 carbon atoms; and mixtures thereof.

40. The method of claim 39 wherein said hydroxyalkyl (meth)acrylate is selected from hydroxyethyl (meth) acrylate, hydroxypropyl (meth) acrylate, hydroxybutyl (meth)acrylate and mixtures thereof; said epoxide functional monomer is selected from the group consisting of glycidyl (meth)acrylate, 3,4-epoxycyclohexylmethyl (meth)acrylate, 2-(3,4-epoxycyclohexyl) ethyl (meth)acrylate, allyl glycidyl ether and combinations thereof; said lactone is selected from the group consisting of β-propiolactone, β-butyrolactone, γ-butyrolactone, α-methyl-γ-butyrolactone, δ-valerolactone, γ-lactone, γ-caprolactone, ε-caprolactone and mixtures thereof; and said beta-hydroxy ester functional (meth) acrylate is the reaction product of glycidyl (meth)acrylate and isostearic acid.

41. The method of claim 28 wherein $R_1$ is hydrogen or methyl, Y is —$(CH_2)_n$—, n being an integer from 1 to 11.

42. A low surface tension monomer containing gradient copolymer prepared according to the method of claim 25.

43. The low surface tension monomer containing copolymer as claimed in claim 42 wherein said copolymer is a random copolymer having a structure defined by:

$$-[(O)_p(L)_q]-$$

wherein O represents one or more other radically polymerizable ethylenically unsaturated monomers that are free of hydroxyl groups and amine group residues; L represents a low surface tension (meth)acrylate monomer; p and q are integers and represent average numbers of monomer residues; p is be from 1 to 1,000; and q is be from 1 to 200.

44. The low surface tension monomer containing copolymer as claimed in claim 42 wherein said copolymer is a block copolymer having a structure defined by:

$$-[-(O)_p-(L)_q-]_x-$$

wherein O represents one or more other radically polymerizable ethylenically unsaturated monomers that are free of hydroxyl groups and amine group residues; L represents a low surface tension (meth)acrylate monomer; p and q are integers and represent average numbers of monomer residues; p is be from 1 to 1,000; q is be from 1 to 200, x is an integer representing the number of block sequences and x is from 1 to 1,000.

45. The low surface tension monomer containing copolymer as claimed in claim 42, wherein said copolymer has the following gradient copolymer chain structure:

$$\phi-[(M)_{s-a}-(F)_a-(M)_{s-2a}-(F)_{2a}-(M)_{s-3a}-(F)_{3a}-\ldots-(M)_{s-na}-(F)_{na}-T]_z$$

wherein s is an integer from 1 to 300 and is constant for a given copolymer, a is an integer from 1 to 10 and is constant for a given copolymer, n is an integer from 1 to 299 such that s, n and a satisfy the relationship s-na≧0 for each value of n, M represents the other radically polymerizable ethylenically unsaturated monomers, F represents the radically polymerizable low surface tension (meth)acrylate monomer, φ is or is derived from the residue of the initiator free of radically transferable groups; T is or is derived from the radically transferable group of the initiator; and z is at least 1, and said low surface tension containing copolymer has a polydispersity index of less than 2.5.

46. The low surface tension containing copolymer of claim 45 wherein T is halide.

47. The low surface tension containing copolymer of claim 45 wherein T is derived from a dehalogenation post-reaction.

48. The low surface tension containing copolymer of claim 47 wherein said dehalogenation post-reaction comprises contacting said copolymer with a limited radically polymerizable ethylenically unsaturated compound.

49. The low surface tension containing copolymer of claim 48 wherein said limited radically polymerizable ethylenically unsaturated compound is selected from the group consisting of 1,1-dimethylethylene, 1,1-diphenylethylene, isopropenyl acetate, alpha-methyl styrene, 1,1-dialkoxy olefin and combinations thereof.

50. The low surface tension containing copolymer of claim 42 wherein said block copolymer has a number average molecular weight of from 500 to 100,000.

51. The low surface tension monomer containing copolymer of claim 45 defined by the structure:

$$\phi-\{[-(M)_{s-a}-(E)_a-\ldots-(M)_{s-na}-][L]_m-T\}_z$$

wherein s is an integer from 1 to 300 and is constant for a given copolymer; a is an integer from 1 to 200 and is constant for a given copolymer; n is an integer from 1 to 299 such that , n and a satisfy the relationship s-na≧0 for each value of n; M represents the other radically polymerizable ethylenically unsaturated monomers; L represents the radically polymerizable low surface tension (meth)acrylate monomer; φ is or is derived from the residue of the initiator free of radically transferable groups; T is or is derived from the radically transferable group of the initiator; and z is at least 1; E is a third polymerizable ethylenically unsaturated monomer; and m is an integer from 1 to 50.

* * * * *

UNITED STATES PATENT AND TRADEMARK OFFICE
CERTIFICATE OF CORRECTION

PATENT NO. : 6,841,641 B2
DATED : January 11, 2005
INVENTOR(S) : Kurt G. Olson et al.

It is certified that error appears in the above-identified patent and that said Letters Patent is hereby corrected as shown below:

Column 29,
Line 22, "or" should read -- for --.

Column 31,
Line 15, insert -- wherein -- after "2".
Line 33, insert a comma (,) after "monomers".

Column 32,
Line 34, in the formula, change "-[L]m-}z" to -- [L]m-T}z --

Column 33,
Line 9, "or" should read -- for --.

Column 34,
Line 4, "an" should read -- and --.
Line 43, "halide" should read -- halides --.

Column 36,
Line 52, in the formula, change "-(M)s-na-]-" to read -- -(M)s-na-(E)na]- --.
Line 57, insert an -- s -- after "that".

Signed and Sealed this

Twenty-fourth Day of May, 2005

JON W. DUDAS
*Director of the United States Patent and Trademark Office*